United States Patent
Wells

(10) Patent No.: US 10,750,515 B2
(45) Date of Patent: *Aug. 18, 2020

(54) OPPORTUNISTIC RESOURCE SHARING BETWEEN DEVICES

(71) Applicant: INTEL CORPORATION, Santa Clara, CA (US)

(72) Inventor: Kevin C. Wells, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,716

(22) Filed: Feb. 15, 2019

(65) Prior Publication Data

US 2019/0182839 A1   Jun. 13, 2019

Related U.S. Application Data

(63) Continuation of application No. 15/144,669, filed on May 2, 2016, now Pat. No. 10,212,712, which is a continuation of application No. 13/338,848, filed on Dec. 28, 2011, now Pat. No. 9,332,551.

(51) Int. Cl.
    *H04W 72/04* (2009.01)
    *H04W 52/02* (2009.01)
    *H04W 72/12* (2009.01)

(52) U.S. Cl.
    CPC ... *H04W 72/0486* (2013.01); *H04W 52/0219* (2013.01); *H04W 72/1252* (2013.01); *Y02D 70/00* (2018.01); *Y02D 70/1222* (2018.01); *Y02D 70/1224* (2018.01); *Y02D 70/1244* (2018.01); *Y02D 70/1246* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/22* (2018.01)

(58) Field of Classification Search
    CPC ......... H04W 72/0486; H04W 72/1252; H04W 52/0219; Y02D 70/00; Y02D 70/1222; Y02D 70/1244; Y02D 70/1246; Y02D 70/22; Y02D 70/146; Y02D 70/168; Y02D 70/144; Y02D 70/142; Y02D 70/1224; Y02D 70/164
    See application file for complete search history.

(56) References Cited

U.S. PATENT DOCUMENTS

| 2002/0151325 A1* | 10/2002 | Fitton | H04W 88/06 455/553.1 |
| 2008/0317036 A1* | 12/2008 | Chandrasiri | H04W 12/0806 370/395.3 |

* cited by examiner

Primary Examiner — Dady Chery

(57) ABSTRACT

Techniques for opportunistic resource sharing between mobile devices are described. A method comprises identifying a set of homogeneous device resources implemented by multiple devices based in part on resource configuration information received by a wireless transceiver, selecting a shared homogeneous device resource of one of the multiple devices to share between the multiple devices, and sending shared configuration information to identify the shared homogeneous device resource and a share role for each of the multiple devices. Other embodiments are described and claimed.

25 Claims, 15 Drawing Sheets

700

IDENTIFY A SET OF HOMOGENEOUS DEVICE RESOURCES IMPLEMENTED BY MULTIPLE DEVICES BASED IN PART ON RESOURCE CONFIGURATION INFORMATION RECEIVED BY A WIRELESS TRANSCEIVER
702

SELECT A SHARED HOMOGENEOUS DEVICE RESOURCE OF ONE OF THE MULTIPLE DEVICES TO SHARE BETWEEN THE MULTIPLE DEVICES
704

SEND SHARED CONFIGURATION INFORMATION TO IDENTIFY THE SHARED HOMOGENEOUS DEVICE RESOURCE AND A SHARE ROLE FOR EACH OF THE MULTIPLE DEVICES
706

SEND SHARED RESOURCE MESSAGES WITH SHARED RESOURCE INFORMATION FROM THE SHARED HOMOGENEOUS DEVICE RESOURCE WHEN THE SHARED HOMOGENEOUS DEVICE RESOURCE IS A LOCAL DEVICE RESOURCE
708

RECEIVE SHARED RESOURCE MESSAGES WITH SHARED RESOURCE INFORMATION FROM THE SHARED HOMOGENEOUS DEVICE RESOURCE WHEN THE SHARED HOMOGENEOUS DEVICE RESOURCE IS A REMOTE DEVICE RESOURCE
710

COMPARE A SET OF LOCAL DEVICE RESOURCES AND A SET OF REMOTE DEVICE RESOURCES
802

DETECT A MATCH BETWEEN ONE OR MORE OF THE LOCAL DEVICE RESOURCES AND THE REMOTE DEVICE RESOURCES TO FORM A SUBSET OF MATCHED DEVICE RESOURCES
804

RETURN A SET OF HOMOGENEOUS DEVICE RESOURCES COMPRISING THE SUBSET OF MATCHED DEVICE RESOURCES
806

```
COMPARE A SET OF LOCAL OPERATIONAL PARAMETERS
AND A SET OF REMOTE OPERATIONAL PARAMETERS WITH
THRESHOLD OPERATIONAL PARAMETERS
902
```

```
GENERATE A SET OF CANDIDATE DEVICE RESOURCES
BASED ON THE COMPARISON RESULTS
904
```

```
EXCHANGE RESOURCE NEGOTIATION MESSAGES WITH ONE
OR MORE REMOTE DEVICES TO ASSIST IN SELECTION OF
THE SHARED HOMOGENEOUS DEVICE RESOURCE
906
```

```
SELECT THE SHARED HOMOGENEOUS DEVICE RESOURCE
FROM THE SET OF CANDIDATE DEVICE RESOURCES BASED
ON INFORMATION RECEIVED IN A RESOURCE EXCHANGE
MESSAGE
908
```

*FIG. 9*

OPPORTUNISTIC RESOURCE SHARING BETWEEN DEVICES

CROSS-REFERENCE TO RELATED APPLICATIONS

This application is a continuation of, claims the benefit of and priority to previously filed U.S. patent application Ser. No. 15/144,669 filed May 2, 2016, entitled "OPPORTUNISTIC RESOURCE SHARING BETWEEN DEVICES", which is a continuation of, claims the benefit of and priority to previously filed U.S. patent application Ser. No. 13/338,848 filed Dec. 28, 2011, entitled "OPPORTUNISTIC RESOURCE SHARING BETWEEN DEVICES", which are hereby incorporated by reference in their entireties.

This application relates to International Patent Application No. PCT/US12/71401, entitled "OPPORTUNISTIC RESOURCE SHARING BETWEEN DEVICES," filed Dec. 21, 2012. The contents of the aforementioned application are incorporated herein by reference.

BACKGROUND

Power management is a key product feature of electronic devices, particular mobile devices. Mobile devices utilize a portable power supply, such as a battery, to supply power to the various components of the device. Power management is a feature that turns off power, or switches the device to a lower power state, when inactive. This conserves battery power when the mobile device is not in use. Lower power consumption also means lower heat dissipation and overall energy use, which in turn reduces consumer costs and environmental impact. Therefore, improvements in power management techniques may increase these and other benefits.

Another key product feature of electronic devices is redundancy. Often an electronic device only has access to device resources contained within the electronic device, such as a transceiver. If the device resource fails, or becomes non-operational, the electronic device will be unable to use the device resource, which may temporarily or permanently reduce functionality of the electronic device. Therefore, improvements in device management techniques may increase these and other benefits.

BRIEF DESCRIPTION OF THE DRAWINGS

FIG. 7 illustrates an embodiment of a first logic flow.

FIG. 8 illustrates an embodiment of a second logic flow.

FIG. 9 illustrates an embodiment of a third logic flow.

DETAILED DESCRIPTION

Figure 1:
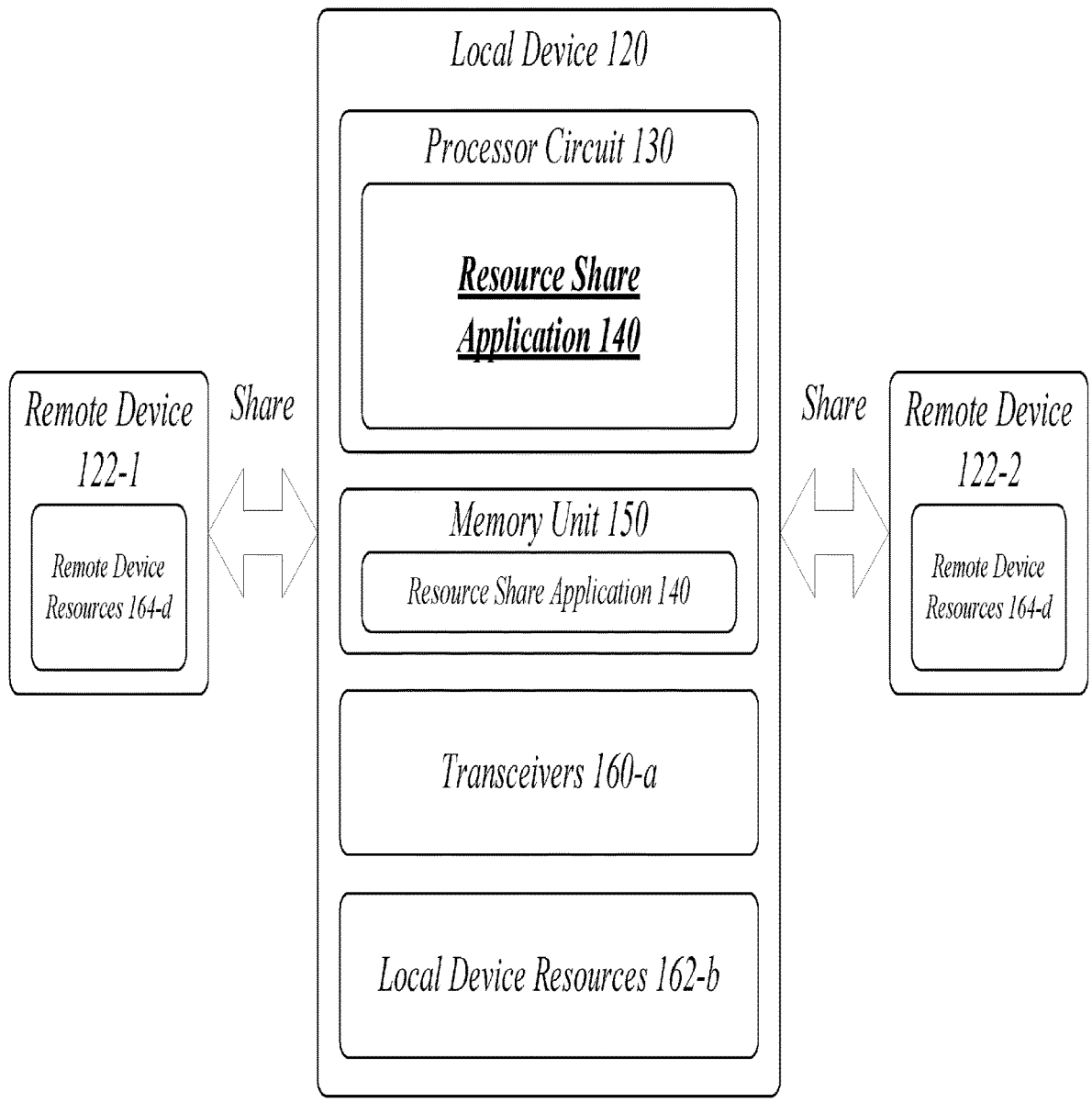
FIG. 1 illustrates an embodiment of a resource share apparatus.

Various embodiments are generally directed to resource sharing techniques for electronic devices. Some embodiments are particularly directed to resource sharing techniques to share homogenous device resources between multiple wireless devices. Resource sharing of homogeneous device resources provides significant advantages in terms of reducing power consumption, heat production, and energy usage of the wireless mobile devices, both individually and collectively. Furthermore, resource sharing provides redundancy for wireless devices when a homogeneous device resource of a wireless device fails or is non-operational, therefore increasing robustness or "high-availability" of services and features provided by the wireless device.

More particularly, a shared homogeneous device resource shared among a group of electronic devices may provide more efficient utilization and conservation of energy resources by reducing energy usage of the entire group of devices. For instance, a shared homogeneous device resource shared by a group of mobile devices may reduce power consumption of an energy resource, such as a battery, for one or more mobile devices by turning on a homogeneous device resource for a single resource producing mobile device and turning off the same or similar homogeneous device resource for one or more resource consuming mobile devices, thereby significantly reducing an average amount of power consumption among a group of mobile devices. When considering that there are potentially billions if not trillions of mobile devices in use, and more entering service every day, the aggregated savings in power consumption may become enormous when considering the potentially trillions of wireless users in the United States, India, China, and elsewhere around the globe. A shared homogeneous device resource may also significantly reduce environmental impact by reducing heat production which may contribute to global warming, extending batter longevity leading to less battery waste disposal, and extending overall device longevity leading to less device waste disposal.

A homogeneous device resource is a component, part or element of one device that is the same or similar in structure and/or function as a component, part or element of another device. For example, assume a first device has a global positioning satellite (GPS) receiver, a thermal sensor and an accelerometer, and a second device has a GPS receiver, a thermal sensor and a barometric pressure sensor. A set of homogeneous device resources between the first and second devices may include the GPS receivers and the thermal sensors, as they are common to both devices. Conversely, a heterogeneous device resource is a component, part or element of one device that is different in structure and function as a component, part or element of another device. A set of heterogeneous device resources between the first and second devices may include the accelerometer and the barometric pressure sensor, as they are or different between both devices.

Wireless mobile devices are a class of electronic devices that may take particular advantage of resource sharing techniques. Wireless mobile devices may include one or more wireless transmitters/receivers ("transceivers") or radios that are often within communication range of each other. Many times wireless mobile devices are within close physical proximity of each other, such as when a group of users (or bearers) are walking down the street together, thereby allowing low-cost short range communications between their devices. Further, certain types of wireless mobile devices may have homogeneous or common device resources, such as computing or communications platform components commonly implemented for such types. For example, smart phones may include common processors, sensors, and transceivers, among other common components, particularly when the smart phones have a same make, model and manufacturer. However, this may be true even when different smart phones are made by different manufacturers.

Embodiments utilize these two phenomena of proximity and homogeneity to allow wireless mobile devices to share homogeneous device resources with each other. For instance, assume a pair of nearby wireless mobile devices (e.g., 1-3 meters) each has a homogeneous device resource in the form of a GPS receiver. Normally, each wireless mobile device would be receiving location data from a GPS satellite at a same time, thereby consuming power, computing and communications resources for each device. However, a granularity of many commercial GPS systems is anywhere from 5 to 10 meters. Therefore each wireless mobile device is receiving essentially redundant data. Embodiments implement resource sharing techniques allowing one wireless mobile device to turn off its GPS receiver and consume GPS information provided by the other GPS receiver, and vice-versa. Which GPS receiver is shared can be variable and determined based on various operational parameters associated with each device, such as available battery power. The devices can perform a negotiation to determine which device is in a better position to share its GPS data. As a result, the embodiments can improve affordability, scalability, modularity, extendibility, or interoperability for an operator, device or network.

With general reference to notations and nomenclature used herein, the detailed description which follows may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a resource share apparatus 100. In one embodiment, the resource share apparatus 100 may comprise a computer-implemented apparatus comprising a local device 120. The local device 120 may comprise, for example, an electronic device having a processor circuit 130, a memory unit 150, and one or more transceivers 160-a. The local device 120 may further have installed a resource share application 140 suitable for locating a network for a remote device. Although the resource share apparatus 100 shown in FIG. 1 has a limited number of elements in a certain topology, it may be appreciated that the resource share apparatus 100 may include more or less elements in alternate topologies as desired for a given implementation.

In various embodiments, the resource share apparatus 100 may comprise a local device 120. Local device 120 may comprise an electronic device. Some examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. In one embodiment, for example, the electronic device may be implemented as a wireless mobile device having a portable power supply and wireless communications capabilities, such as a laptop computer, handheld computer, tablet computer, smart phone, or other electronic device. The embodiments are not limited in this context.

In various embodiments, the resource share apparatus 100 may comprise a processor circuit 130. The processing circuit 130 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core (2) Quad®, Core i3®, Core i5®, Core i7®, Atom®, Itanium®, Pentium®, Xeon®, and XScale® processors; and similar processors. Dual microprocessors, multi-core processors, and other multi-processor architectures may also be employed as the processing circuit 130.

In various embodiments, the resource share apparatus 100 may comprise a memory unit 150. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

In various embodiments, the resource share apparatus 100 may comprise one or more transceivers 160-a. Each of the transceivers 160-a may be implemented as wired transceivers, wireless transceivers, or a combination of both. In some embodiments, the transceivers 160-a may be implemented as physical wireless adapters or virtual wireless adapters, sometimes referred to as "hardware radios" and "software radios." In the latter case, a single physical wireless adapter may be virtualized using software into multiple virtual wireless adapters. A physical wireless adapter typically connects to a hardware-based wireless access point. A virtual wireless adapter typically connects to a software-based wireless access point, sometimes referred to as a "SoftAP." For instance, a virtual wireless adapter may allow ad hoc communications between peer devices, such as a smart phone and a desktop computer or notebook computer. Various embodiments may use a single physical wireless adapter implemented as multiple virtual wireless adapters, multiple physical wireless adapters, multiple physical wireless adapters each implemented as multiple virtual wireless adapters, or some combination thereof. The embodiments are not limited in this case.

It is worthy to note that "a" and "b" and "c" and similar designators as used herein are intended to be variables representing any positive integer. Thus, for example, if an implementation sets a value for a=5, then a complete set of transceivers 160-a may include transceivers 160-1, 160-2, 160-3, 160-4 and 160-5. The embodiments are not limited in this context.

The transceivers 160-a may comprise or implement various communication techniques to allow the local device 120 to communicate with other electronic devices via a network. For instance, the transceivers 160-a may implement various types of standard communication elements designed to be interoperable with a network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the local device 120 may implement different types of transceivers 160-a. Each of the transceivers 160-a may implement or utilize a same or different set of communication parameters to communicate information between various electronic devices. In one embodiment, for example, each of the transceivers 160-a may implement or utilize a different set of communication parameters to communicate information between the local device 120 and a remote device. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the transceivers 160-a. The embodiments are not limited in this context.

In various embodiments, the transceivers 160-a may implement different communication parameters offering varying bandwidths, communications speeds, or transmission range. For instance, a first transceiver 160-1 may comprise a short-range interface implementing suitable communication parameters for shorter range communications of information, while a second transceiver 160-2 may comprise a long-range interface implementing suitable communication parameters for longer range communications of information.

In various embodiments, the terms "short-range" and "long-range" may be relative terms referring to associated communications ranges (or distances) for associated transceivers 160-a as compared to each other rather than an objective standard. In one embodiment, for example, the term "short-range" may refer to a communications range or distance for the first transceiver 160-1 that is shorter than a communications range or distance for another transceiver 160-a implemented for the local device 120, such as a second transceiver 160-2. Similarly, the term "long-range" may refer to a communications range or distance for the second transceiver 160-2 that is longer than a communications range or distance for another transceiver 160-a implemented for the local device 120, such as the first transceiver 160-1. The embodiments are not limited in this context.

In various embodiments, the terms "short-range" and "long-range" may be relative terms referring to associated communications ranges (or distances) for associated transceivers 160-a as compared to an objective measure, such as provided by a communications standard, protocol or interface. In one embodiment, for example, the term "short-range" may refer to a communications range or distance for the first transceiver 160-1 that is shorter than 300 meters or some other defined distance. Similarly, the term "long-range" may refer to a communications range or distance for the second transceiver 160-2 that is longer than 300 meters or some other defined distance. The embodiments are not limited in this context.

In one embodiment, for example, the transceiver 160-1 may comprise a radio designed to communicate information over a wireless personal area network (WPAN) or a wireless local area network (WLAN). The transceiver 160-1 may be arranged to provide data communications functionality in accordance with different types of lower range wireless network systems or protocols. Examples of suitable WPAN systems offering lower range data communication services may include a Bluetooth system as defined by the Bluetooth Special Interest Group, an infra-red (IR) system, an Institute of Electrical and Electronics Engineers (IEEE) 802.15 system, a DASH7 system, wireless universal serial bus (USB), wireless high-definition (HD), an ultra-side band (UWB) system, and similar systems. Examples of suitable WLAN systems offering lower range data communications services may include the IEEE 802.xx series of protocols, such as the IEEE 802.11a/b/g/n series of standard protocols and variants (also referred to as "WiFi"). It may be appreciated that other wireless techniques may be implemented, and the embodiments are not limited in this context.

In one embodiment, for example, the transceiver 160-2 may comprise a radio designed to communicate information over a wireless local area network (WLAN), a wireless metropolitan area network (WMAN), a wireless wide area network (WWAN), or a cellular radiotelephone system. The transceiver 160-2 may be arranged to provide data communications functionality in accordance with different types of longer range wireless network systems or protocols. Examples of suitable wireless network systems offering longer range data communication services may include the IEEE 802.xx series of protocols, such as the IEEE 802.11a/b/g/n series of standard protocols and variants, the IEEE 802.16 series of standard protocols and variants, the IEEE 802.20 series of standard protocols and variants (also referred to as "Mobile Broadband Wireless Access"), and so forth. Alternatively, the transceiver 160-2 may comprise a radio designed to communication information across data networking links provided by one or more cellular radio-telephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and similar systems. It may be appreciated that other wireless techniques may be implemented, and the embodiments are not limited in this context.

In various embodiments, the transceivers 160-a may include a third transceiver 160-3 (or a singular receiver 160-3) designed to provide location based services (LBS) for the local device 120, such as identifying a geographic location for the local device 120. In one embodiment, the transceiver 160-3 may be designed to communicate with a satellite system, such as a GPS receiver designed to communicate with a space-based or low earth orbit (LEO) satellite navigation system. A satellite navigation system provides location and time information in all weather, anywhere on or near the earth, where there is an unobstructed line of sight to one or more GPS satellites. While a GPS receiver is a system designed and used by the United States of America, the transceiver 160-3 may also be a location receiver suitable for use with satellite systems designed and used by other countries, such as the Russian global navigation satellite system (GLONASS), the European Union Galileo Positioning System, the Chinese Compass Navigation System, Indian Regional Navigational Satellite System, and so forth. The transceiver 160-3 may also comprise a local positioning system (LPS) using earth-based beacons, such as cellular base stations, wireless access points, broadcast towers, and so forth. A LPS may be used to implement, for example, mobile phone tracking to approximate a location of a mobile phone using cellular triangulation techniques. The embodiments are not limited to these examples.

In other embodiments, the transceivers 160-1, 160-2 may implement a same set of communication parameters offering identical or substantially similar bandwidths, communications speeds, or transmission ranges. However, transceivers 160-1, 160-2 may be utilized at different points in time. In another variant the local device 120 may implement a single transceiver 160-4 utilized for different types of communications at different points in time, such as a single WiFi physical wireless adapter virtualized into multiple virtual wireless adapters. The embodiments are not limited in this context.

The local device 120 may further comprise one or more local device resources 162-b. Local device resources 162-b may comprise various computing and communications platform hardware and software components typically implemented by a wireless mobile device, such as the local device 120. Some examples of local device resources 162-b may include without limitation a processor (e.g., the processor circuit 130), a graphics processing unit (GPU), a chipset/platform control hub (PCH), an input/output (I/O) device, computer-readable media (e.g., memory unit 150), display electronics, display backlight, network interfaces, wireless transceivers (e.g., transceivers 160-a), location devices (e.g., a GPS receiver), sensors (e.g., biometric, thermal, environmental, proximity, accelerometers, barometric, pressure, etc.), portable power supplies (e.g., a battery), application programs, system programs, and so forth. Other examples of local device resources 162-b are described with reference to exemplary computing and communications architectures shown by FIGS. 11, 12. The embodiments, however, are not limited to these examples.

In the illustrated embodiment shown in FIG. 1, the processor circuit 130 may be communicatively coupled to the transceivers 160-a and the memory unit 150. The memory unit 150 may store a resource share application 140 arranged for execution by the processor circuit 130 to share a local device resource 162-b with a remote device 122-c. The local device 120 may communicate with one or more remote devices 122-c via one or more transceivers 160-a. The remote devices 122-c may be the same, or similar to, the local device 120. The remote devices 122-c may implement similar elements as the local device 120, including a resource share application 140 and a set of remote device resources 164-d. Examples of the remote device resources 164-d may include those provided for the local device resources 162-b as previously described.

The resource share application 140 may generally provide features to share a homogeneous device resource among multiple devices, such as the local device 120 and one or more remote devices 122-c. In one embodiment, for example, the resource share application 140 may allow the local device 120 to share local device resources 162-*b* with one or more remote devices 122-*c*. Alternatively, the resource share application 140 may allow the local device 120 to share remote device resources 164-*d* implemented by one or more remote devices 122-*c* within communication range of the transceivers 160-*a*. It is worthy to note that some embodiments may be described in terms of sharing a homogenous device resource between the local device 120 and a single remote device 122-1 for clarity. It may be appreciated, however, that the local device 120 may share a homogenous device resource between the local device 120 and multiple remote devices 122-*c* using the same or similar principles as those described between the local device 120 and the remote device 122-1. The embodiments are not limited in this context.

Figure 2:
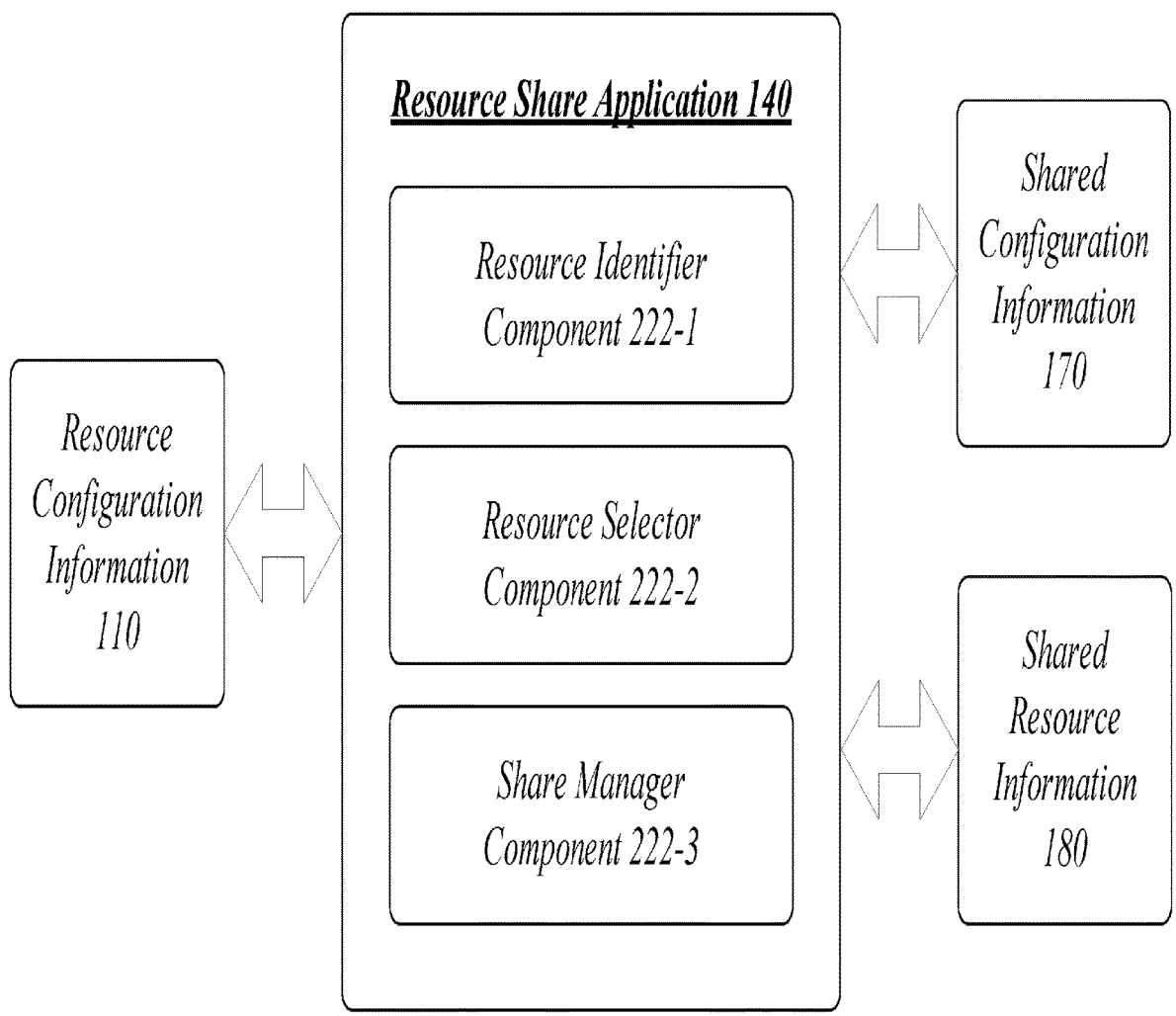
FIG. 2 illustrates an embodiment of a first operating environment for a resource share application.

FIG. 2 illustrates an embodiment of an operating environment 200 for the resource share apparatus 100. More particularly, the operating environment 200 may illustrate a more detailed block diagram for the resource share application 140.

As shown in FIG. 2, the resource share application 140 may comprise various components 222-*e*. As used in this application, the term "component" is intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 2, the resource share application 140 may comprise a resource identifier component 222-1 generally arranged to identify a set of homogeneous device resources implemented by the local device 120 and remote devices 122-*c* based in part on resource configuration information 110 received from the remote devices 122-*c* by a transceiver 160-1. The resource share application 140 may further comprise a resource selector component 222-2 generally arranged to select a shared homogeneous device resource from the set of homogenous device resources to share between the local device 120 and remote devices 122-*c*. The resource share application 140 may still further comprise a share manager component 222-3 generally arranged to send shared configuration information 170 to identify the shared homogeneous device resource and a share role for each of the local device 120 and remote devices 122-*c*. Once the electronic devices 120 are properly configured for resource sharing operations, the share manager component 222-3 may either send resource share messages with shared resource information 180 from the shared homogeneous device resource to one or more remote devices 122-*c* when the shared homogeneous device resource is a local device resource 162-*b*, or receive resource share messages with shared resource information 180 from the shared homogeneous device resource when the shared homogeneous device resource is a remote device resource 164-*d*.

Although the resource share application 140 shown in FIG. 2 has only three components in a certain topology, it may be appreciated that the resource share application 100 may include more or less components in alternate topologies as desired for a given implementation. The embodiments are not limited in this context.

Figure 3:
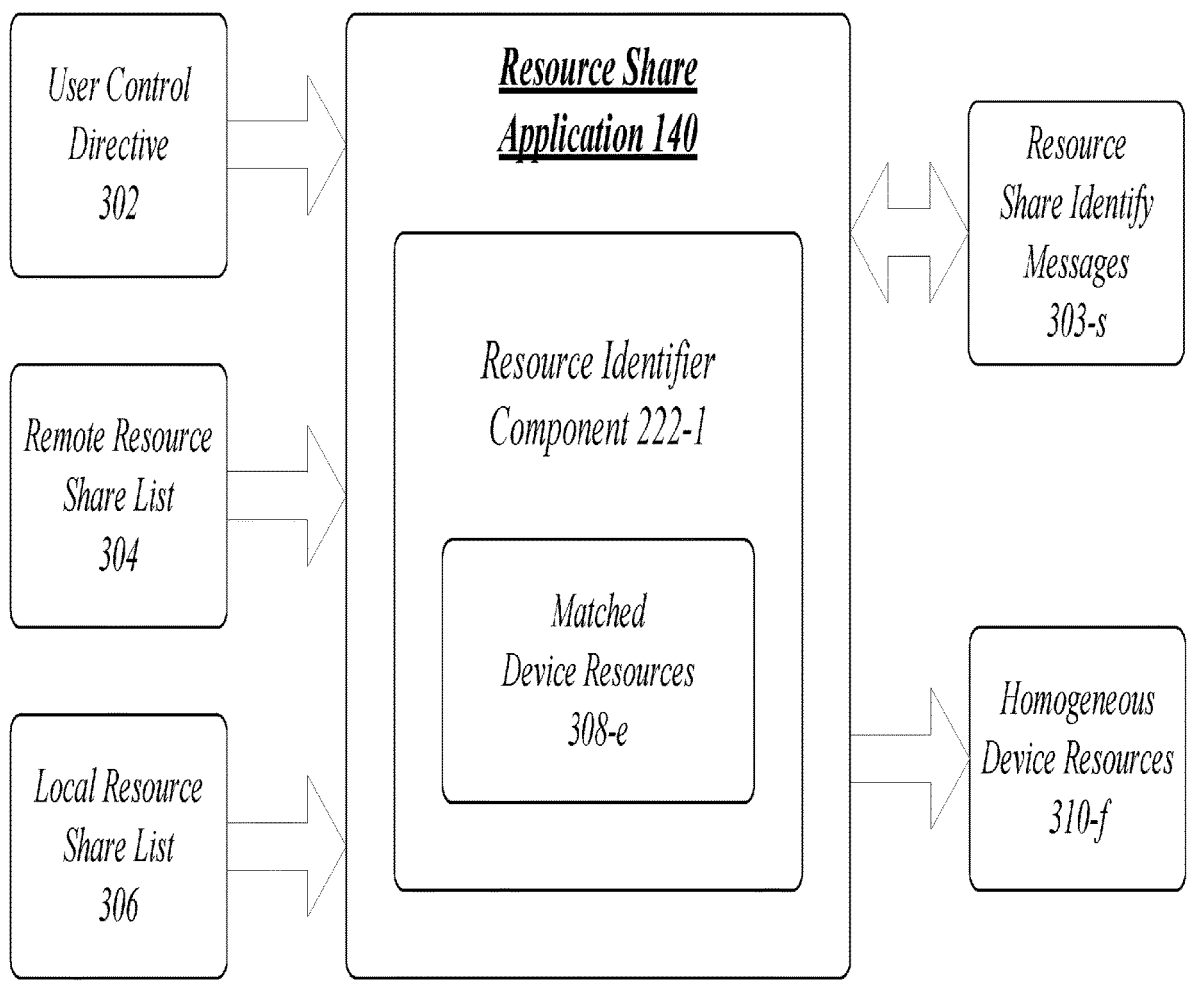
FIG. 3 illustrates an embodiment of a second operating environment for a resource share application.

FIG. 3 illustrates an embodiment of an operating environment 300 for the resource share apparatus 100. More particularly, the operating environment 300 may illustrate a more detailed block diagram for a resource identifier component 222-1 of the resource share application 140.

In the illustrated embodiment shown in FIG. 3, the resource share application 140 may comprise a resource identifier component 222-1 generally arranged to identify a set of homogeneous device resources 310-*f* implemented by multiple electronic devices 120 based in part on resource configuration information 110 from one or more remote devices 122-*c* received by a transceiver 160-1.

Resource share operations may be triggered in a number of different ways. For example, the resource identifier component 222-1 may receive as input a user control directive 302 to initiate resource share operations. The user control directive 302 may be generated, for example, when a user of the local device 120 selects a user interface element, such as a graphical user interface (GUI) element of a GUI view presented to the user, such as a GUI button labeled "Resource Share Mode." In other examples, the resource share application 140 may automatically initiate resource share operations by detecting a presence of one or more remote devices 122-*c*, detecting when a user is in a certain location, detecting a certain time of day, and other triggers. The embodiments are not limited in this context.

In any case, once triggered, the resource identifier component 222-1 may initiate resource scans by broadcasting one or more resource share identify messages 303-*s* requesting resource configuration information 110 from one or more remote devices configured with a resource share application 140.

The resource identifier component 222-1 receives different sets of resource configuration information 110 from different remote devices 122-*c*, and retrieves a remote resource share list 304 from each set of resource configuration information 110. The remote resource share list 304 comprises a set of remote device resources 164-*d* available for sharing among multiple electronic devices. The remote device resources 164-*d* may comprise any device resource as described for the local device resources 162-*b* that is available for sharing with another device. In one embodiment, for example, the set of remote device resources 164-*d* may include a location device, a sensor, or a transceiver, among other device resources.

The resource identifier component 222-1 may also retrieve a local resource share list 306 from the memory unit 150. The local resource share list 306 may comprise a set of local device resources 162-*b* available for sharing among multiple electronic devices. In one embodiment, for example, the set of local device resources 162-*b* may include a location device, a sensor, or a transceiver, among other device resources.

The resource identifier component 222-1 may compare the set of local device resources 162-*b* and the set of remote device resources 164-*d*, and detect any matches between one or more of the local device resources 162-*b* and the remote device resources 164-*d* to form a subset of matched device resources 308-*e*. For example, assume a remote resource share list 304 includes 4 remote device resources 164-1 to 164-4 representing a location device, a proximity sensor, an accelerometer, and a transceiver 160-1, respectively, as currently available for resource share operations. Further assume a local resource share list 306 includes 4 local device resources 162-1 to 162-4 representing a location device, a proximity sensor, an accelerometer, and a transceiver 160-2 as currently available for resource share operations. The resource identifier 222-1 may initially return the device resources 162-1, 164-1 (e.g., location devices), the device resources 162-2, 164-2 (e.g., proximity sensors) and the device resources 162-3, 164-3 (e.g., accelerometers) as matched device resources 308-1, 308-2, and 308-3, respectively.

Accuracy of matching operations performed by the resource identifier component 222-1 may depend on a particular implementation. Various embodiments may need varying levels of homogeneity between a local device resource 162-*b* and a remote device resource 164-*d*, with corresponding levels of device information needed from the resource configuration information 110 to perform matching operations. In one embodiment, for example, a local device resource 162-*b* and a remote device resource 164-*d* may need to be identical in order to ensure compatibility of data feeds. In this case, the resource configuration information 110 may include a more fine level of detail needed to ensure an exact match, such as a device name, a device part number, a device version number, a device manufacturer, or other information. In another embodiment, for example, a local device resource 162-*b* and a remote device resource 164-*d* may only need to be similar in nature, or perform the same function, and suitable translators may be implemented for any differences to ensure compatibility of data feeds. In this case, the resource configuration information 110 may include a more gross level of detail needed to ensure a close match, such as a device name and a device part number, for example.

Once the resource identifier 222-1 generates a list of matched device resources 308-*e*, the resource identifier 222-1 may employ a filter to find a match with match parameters sufficient for designation as a homogeneous device resource 310-*f* suitable for sharing between the local device 120 and the remote devices 122-*c*. Continuing with our previous example, the resource identifier component 222-1 may filter the matched device resources 308-1, 308-2 and 308-3 with a more refined set of match parameters to ensure that there is a more precise match. Assume the matched device resources 308-1, 308-2 are identical, while the matched devices resources 308-3 are similar but not sufficiently identical to be considered homogeneous for this implementation. The resource identifier component 222-1 may return the matched device resources 308-1, 308-2 as a set of homogeneous device resources 310-1, 310-2, respectively.

Figure 4:
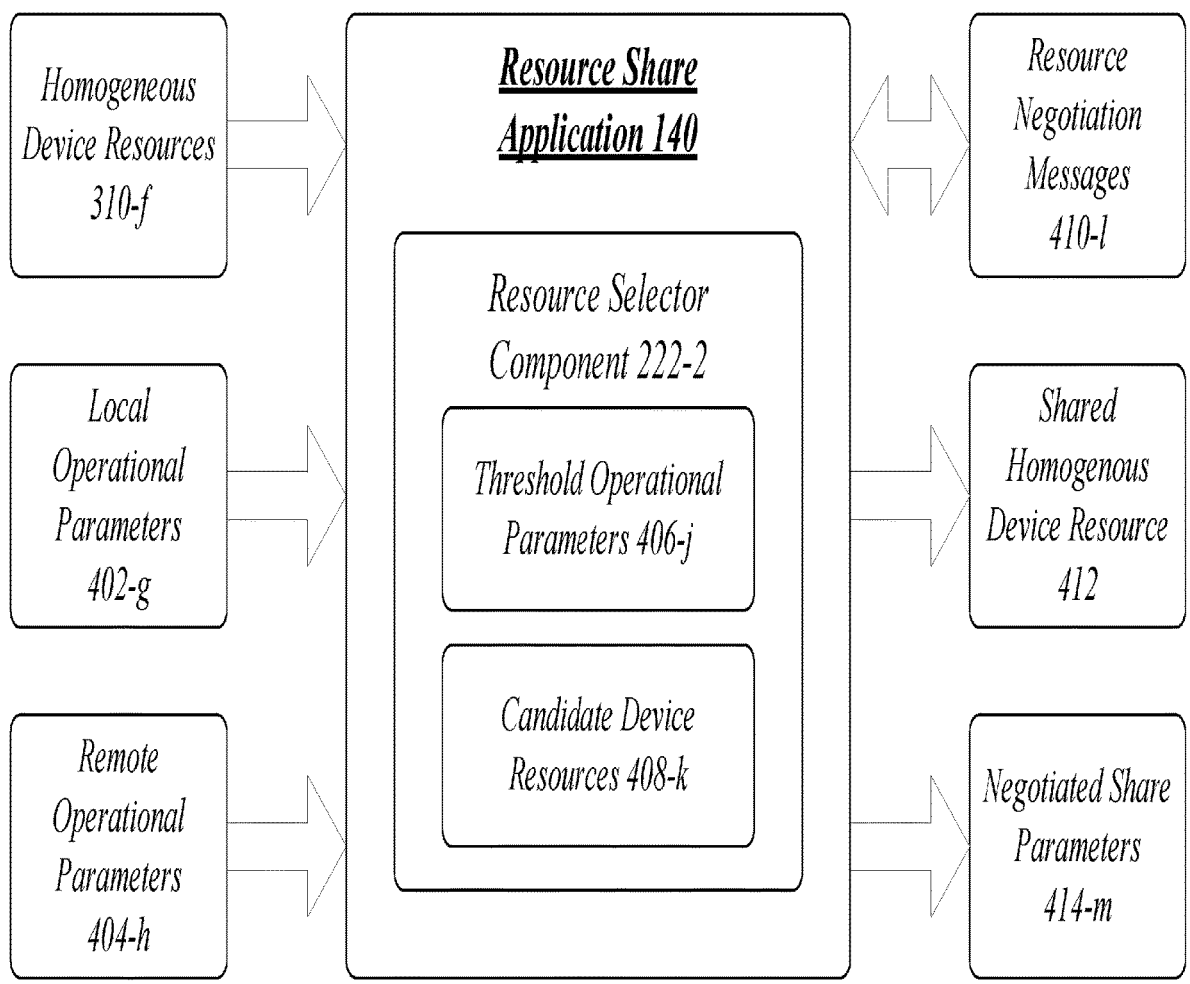
FIG. 4 illustrates an embodiment of a third operating environment for a resource share application.

FIG. 4 illustrates an embodiment of an operating environment 400 for the resource share apparatus 100. More particularly, the operating environment 400 may illustrate a more detailed block diagram for a resource selector component 222-2 of the resource share application 140.

As previously described, the resource share application 140 may comprise a resource selector component 222-2 generally arranged to select a shared homogeneous device resource 310-*f* of the local device 120 or remote devices 122-*c* to share between the local device 120 and remote devices 122-*c*. As shown in FIG. 4, the resource selector component 222-2 may receive as input the set of homogeneous device resources 310-*f* generated by the resource identifier component 222-1. The resource selector component 222-2 may further receive a set of local operational parameters 402-*g* representing a current operational state for a corresponding set of local device resources 162-*b*, and a set of remote operational parameters 404-*h* representing a current operational state for a corresponding set of remote device resources 164-*d*. A current operational state may be quantified as an operating mode (e.g., an active state or inactive state), a measured quantity (e.g., 30% battery power remaining), statistical information (e.g., an average communications rate), and any other information describing operational characteristics of a device resource. In one embodiment, the current operational state may correspond to a given device resource 162-*b*, 164-*d* within matched device resources 308-*e*. For instance, if a matched device resource 308-*e* includes a transceiver 160-1, the current operational state may represent an operating state of the transceiver 160-1. In one embodiment, the current operational state may correspond to a given device resource 162-*b*, 164-*d* outside of the matched device resources 308-*e*. For instance, if a matched device resource 308-*e* includes a transceiver 160-1, the current operational state may represent an operating state of a power supply (e.g., a battery) for the transceiver 160-1. The embodiments are not limited in this context.

The resource selector component 222-2 may compare a set of local operational parameters 402-*g* and a set of remote operational parameters 404-*h* with one or more threshold operational parameters 406-*j* stored in the memory unit 150. The threshold operational parameters 406-*j* may operate as a gross filter to identify homogeneous device resources 310-*f* that meet some baseline or minimum thresholds in order to be considered for selection as a shared homogeneous device resource 412.

The threshold operational parameters 406-*j* may be derived in a number of different ways. A threshold parameter 406-*j* could be set based on, for example, minimum power levels needed to participate in resource sharing operations. A threshold parameter 406-*j* could also be set based on historical information. A threshold parameter 406-*j* could also be set based on statistical information for a current operating environment. They could also be arbitrarily set by the user. It is worthy to note that the threshold values 406-*j* could be set in a way to easily disable use of the threshold parameters 406-*j* for a given implementation. For example, using a power level operational parameter as an example, setting a threshold level of 0% would be the same as having no threshold at all, and all device resources would be considered valid candidates. On the other extreme, a threshold level of 100% would mean that nobody could share. The embodiments are not limited in this context.

The resource selector component 222-2 may generate a set of candidate device resources 408-*k* based on the comparison results. Continuing with our previous example, assume the homogeneous device resources 310-*f* include a set of two homogenous device resources 310-1, 310-2 representing the matched device resources 308-1, 308-2, respectively. The matched device resources 308-1, 308-2 may represent homogeneous device resources 162-1, 164-1 (e.g., location devices) and device resources 162-2, 164-2 (e.g., proximity sensors), respectively. The resource selector application 222-2 may retrieve a local operational parameter 402-1 for a local device resource 162-3 representing a local battery comprising a power level of 70% for the local battery. Similarly, the resource selector application 222-2 may retrieve a remote operational parameter 404-1 for a remote device resource 164-3 representing a remote battery comprising a power level of 50% for the remote battery. The resource selector application 222-2 may compare the operational parameters 402-1, 404-1 with a threshold operational parameter 406-1 representing a threshold power level of 40%. The resource selector component 222-2 may then generate a set of candidate device resources 408-1, 408-2 corresponding to the matched device resource 308-1 representing the device resources 162-1, 164-1 (e.g., location devices), since the operational parameters 402-1, 404-1 of 70% and 50%, respectively, were both above the threshold power level of 40%.

Once a set of candidate device resources 408-$k$ is generated, the resource selector component 222-2 may select a shared homogeneous device resource 412 from the set of candidate device resources 408-$k$. The resource selector component 222-2 may use a set of selection rules operating as a fine filter to select a shared homogeneous device resource 412 from among the candidate device resources 408-$k$. The selection rules are designed to select which of the candidate device resources 408-$k$, each of which is a suitable candidate for sharing, is in a superior position for sharing.

In one embodiment, a selection rule may be based on comparing relative values of the operational parameters 402-$g$, 404-$h$, with the resource selector component 222-2 selecting a shared homogeneous device resource 412 with a higher operational parameter 402-$g$, 404-$h$. Continuing with our previous example, the resource selector component 222-2 may select the local device resource 162-1 as the shared homogeneous device resource 412 since it has a higher amount of battery power (e.g., 70%) than the remote device resource 164-1 (e.g., 50%). In a different example, assume the homogeneous device resources 310-$f$ includes a set of transceivers. In this case, the resource selector component 222-2 might select a transceiver with a higher signal strength based on a signal strength identifier. A signal strength identifier may comprise some form of statistical measurement of power present in a received radio signal, noise in a received radio signal, error rates in a received signal, ratios of a received signal, or other statistical measurement. Examples of signal strength identifiers may include without limitation a received signal strength indicator (RSSI), received channel power indicator (RCPI), signal-to-noise ratio (SNR) indicator, signal-to-noise plus interference ratio (SNIR) indicator, carrier-to-noise ratio (CNR) indicator, carrier-to-receiver noise density (C/kT) indicator, energy per bit to noise density (Eb/NO) indicator, energy per symbol to noise density (Es/NO) indicator, modulation error rate (MER) indicator, signal noise and distortion (SINAD) indicator, signal-to-interference ratio (SIR) indicator, signal-to-quantization-noise ratio (SQNR) indicator, and so forth. The embodiments are not limited in this context.

In one embodiment, a selection rule may be based on sequentially selecting a candidate device resource 408-$k$ from a set of candidate device resources 408-$k$. For instance, if a set of candidate device resources 408-$k$ including candidate device resources 408-1, 408-2 and 408-3, the resource selector component 222-2 may select the candidate device resource 408-1 as a shared homogeneous device resource 412 since it is first in the set, and update a counter. In another iteration, such as when the local device 120 and a remote device 122-1 desires to assign a new shared homogeneous device resource 412, the resource selector component 222-2 may select the candidate device resource 408-2 as a shared homogeneous device resource 412 since it is sequentially next in the set, and update the counter. This ensures a fair distribution of workload during resource share operations.

In one embodiment, a selection rule may be based on randomly selecting a candidate device resource 408-$k$ from a set of candidate device resources 408-$k$. For instance, if a set of candidate device resources 408-$k$ including candidate device resources 408-1, 408-2 and 408-3, the resource selector component 222-2 may randomly select the candidate device resource 408-3 as a shared homogeneous device resource 412 using a random or pseudo-random selection technique, and update a counter. In another iteration, such as when the local device 120 and a remote device 122-1 desires to assign a new shared homogeneous device resource 412, the resource selector component 222-2 may randomly select the candidate device resource 408-2 as a shared homogeneous device resource 412, and update the counter. This ensures a relatively fair distribution of workload during resource share operations.

As previously described, the resource selector component 222-2 may use a two-tiered selection technique to select a shared homogeneous device resource 412, with the first tier utilizing threshold operational parameters 406-$j$ as a gross filter to generate a set of candidate device resources 408-$k$, and the second tier utilizing selection rules as a fine filter to select a shared homogeneous device resource 412 from the set of candidate device resources 408-$k$. It may be appreciated, however, that a single tier selection technique or a multi-tier selection technique of 3 or more tiers may be used as desired for a given implementation. The embodiments are not limited in this context.

Before selecting a shared homogeneous device resource 412, the resource selector component 222-2 may need to exchange one or more resource negotiation messages 410-$l$ with one or more remote devices 122-$c$, such as remote device 122-1, to select a shared homogeneous device resource 412. Since local device resources 162-$b$ and remote device resources 164-$d$ are implemented by separate devices, the resource selector component 222-2 may need to obtain permission before selecting one of the device resources 162-$b$, 164-$d$ as a shared homogeneous device resource 412. This is because a shared homogeneous device resource 412 consumes resources of the local device 120 or the remote device 122-1, such as battery power, computing resources, communications resources, memory resources, and so forth. Furthermore, permission may need to be obtained for other reasons, such as privacy, preferences, or even commercial restrictions. In this case, the resource selector component 222-2 may exchange resource negotiation messages 410-$l$ to negotiate which device resource, and under what conditions, may be used as a shared homogeneous device resource. In one embodiment, negotiations may be automatically performed without manual input of users by using a set of defined policy rules and/or user preferences implemented for the local device 120 and the remote device 122-1. In one embodiment, negotiations may be manually performed, where the resource negotiations message 410-$l$ are surfaced to the users via a user interface, and selections are made by the users as input to the user interface.

Once negotiations are concluded, the resource selector component 222-2 may generate a set of negotiated share parameters 414-$m$ for a shared homogeneous device resource 412. For instance, a negotiated share parameter 414-1 may include a share role parameter for each of the multiple devices. A share role parameter may identify a share role to be assigned to each device. A first share role may comprise a producer role assigned to a device implementing a shared homogeneous device resource 412, or rather producing resource information for consumption by other devices. A second share role may comprise a consumer role assigned to a device not implementing a shared homogeneous device resource 412, or rather consuming resource information produced by another device. In another example, a negotiated share parameter 414-2 may be a session parameter, where a device or user may determine one or more sessions during which resource sharing may occur. The session parameter may be for a single session (e.g., for this instance only) or multiple sessions (e.g., whenever known devices are proximate to each other). In yet another example, a negotiated share parameter 414-3 may be a defined time interval associated with a share role parameter or a session parameter, where a device or user may determine that they will share a device resource for a defined time interval of 10 minutes per session, alternate sharing of a device resource in a given share role every 5 minutes, and so forth. These are merely a few examples of negotiated share parameters 414-$m$, and others may be used as well as desired for a given implementation. The embodiments are not limited in this context.

Figure 5:
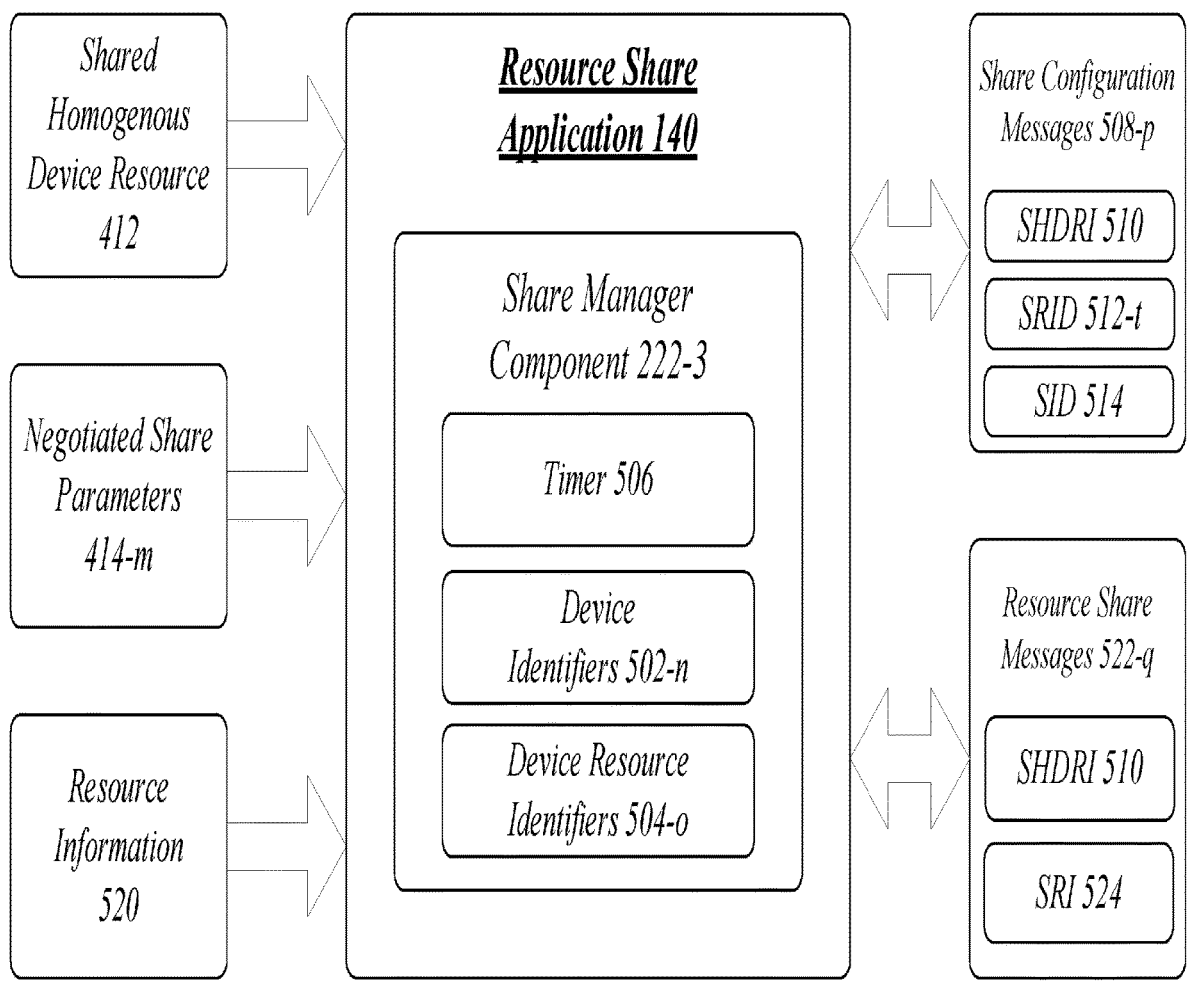
FIG. 5 illustrates an embodiment of a fourth operating environment for a resource share application.

FIG. 5 illustrates an embodiment of an operating environment 500 for the resource share apparatus 100. More particularly, the operating environment 500 may illustrate a more detailed block diagram for a share manager component 222-3 of the resource share application 140.

The share manager component 222-3 is generally arranged to send shared configuration information 170 to identify a shared homogeneous device resource 412 and a share role for each of the local device 120 and remote devices 122-$c$. As shown in FIG. 5, the share manager component 222-3 may receive a shared homogeneous device resource 412 and a set of negotiated share parameters 414-$m$ from the resource selector component 222-2. The share manager component 222-3 may retrieve a device identifier 502-$n$ associated with a local device 120 or a remote device 122-$c$ implementing the shared homogeneous device resource 412.

The share manager component 222-3 may then generate a shared homogeneous device resource identifier 510 for the shared homogeneous device resource 412 using the device identifier 502-$n$. A shared homogeneous device resource identifier 510 is a unique identifier for a shared homogeneous device resource 412 within a sharing group. It is worthy to note that the shared homogeneous device resource identifier 510 does not necessarily need to be a unique identifier between sharing groups, although this might be desirable when sharing groups move and overlap. In this case, a globally unique identifier (GUID) may be assigned to a shared homogeneous device resources 412. A shared homogeneous device resource identifier 510 conserves computing and communications resources on a receive side by allowing a single identifier to identify both a device and a device resource. A shared homogeneous device resource identifier 510 also allows the receive side to quickly filter messages by the shared homogeneous device resource identifier 510, thereby avoiding the need to detect and process all messages communicated by a transmit side.

The share manager component 222-3 may generate a shared homogeneous device resource identifier 510 utilizing a combination of a device identifier 502-$n$ and a device resource identifier 504-$o$ for a shared homogeneous device resource 412. An example of a device resource identifier 504-$o$ may include without limitation a resource name, a resource part number, a resource version number, a resource manufacturer, or any other identifying information. In the event a shared homogeneous device resource 412 does not have any identifying information, or it is unknown to the share manager component 222-3, the share manager component 222-3 may generate a device resource identifier 504-$o$. The share manager component 222-3 may then combine the device identifier 502-$n$ and the device resource identifier 504-$o$ to form a shared homogeneous device resource identifier 510. For instance, a portion of the device identifier 502-$n$ and the device resource identifier 504-$o$ may be combined to form a shared homogeneous device resource identifier 510. It may be appreciated that other techniques may be used to generate a shared homogeneous device resource identifier 510 depending on such design factors as availability of computing resources, a size of a sharing group, characteristics of a sharing group, device characteristics, complexity, and so forth. Any techniques may be used to generate a shared homogeneous device resource identifier 510 as long as a shared homogeneous device resource 412 is uniquely identified within a sharing group. The embodiments are not limited in this context.

The share manager component 222-3 may receive the shared homogeneous device resource 412 and a negotiated share parameter 414-1 implemented as share role parameter associated with a device implementing the shared homogeneous device resource 412. The share manager component 222-3 may generate a share role identifier 512-$t$ for each device based on the negotiated share parameter 414-1, such as a first share role identifier 512-1 for a device implementing the shared homogeneous device resource 412, and a second share role identifier 512-2 for one or more devices not implementing the shared homogeneous device resource 412. For instance, the share manager component 222-3 may generate a producer role as a first share role identifier 512-1 for the local device 120 when implementing the shared homogeneous device resource 412, and a consumer role as a second share role identifier 512-2 for one or more remote devices 122-$c$ not implementing the shared homogeneous device resource 412, and vice-versa. A producer role produces shared resource information 524. A consumer role consumes shared resource information 524.

The share manager component 222-3 may receive the shared homogeneous device resource 412 and a negotiated share parameter 414-2 implemented as a session parameter associated with a device implementing the shared homogeneous device resource 412. The share manager component 222-3 may then generate a session identifier 514 for one or more sessions to share the shared homogeneous device resource 412.

The share manager component 222-3 may receive the shared homogeneous device resource 412 and a negotiated share parameter 414-3 implemented as a time interval associated with a share role parameter or session parameter. The share manager component 222-3 may then generate a time interval for one or more share roles or sessions to share the shared homogeneous device resource 412. A timer 506 may be loaded with the time interval and perform some action on expiration of the time interval, such as terminating a session, creating a new session, switching share roles, re-negotiating the negotiated share parameters 414-$m$, selecting a new shared homogeneous device resource 412, and so forth.

In one embodiment, for example, the share manager component 222-3 may receive the shared homogeneous device resource 412 and a negotiated share parameter 414-2 comprising a session parameter associated with a device implementing the shared homogeneous device resource 412, the session parameter having a defined time interval as defined by a negotiated share parameter 414-3, and generate a session identifier 514 for a session to share the shared homogeneous device resource 412. The share manager component 222-3 may then initiate a timer 506 to monitor the defined time interval, and terminate the session when the timer 506 expires.

Once the share manager component 222-3 uses the various inputs to generate share configuration information 170, such as a shared homogeneous device resource identifier 510, share role identifiers 512-t, and a session identifier 514, the share manager component 222-3 may send one or more share configuration messages 508-p with the share configuration information 170 to the multiple devices. The share configuration information 170 may be used by the receiving devices to configure themselves for a given share role associated with the share role identifiers 512-t, and when in a consumer role, how to receive resource information from the shared homogeneous device resource 412 via the transceivers 160-a. For instance, the share manager component 222-3 may send a share configuration message 508-1 to the local device resource 162-1 or another local device resource 162-2 to 162-b using a local bus architecture, and share configuration messages 508-2, 508-3 to the remote devices 122-1, 122-2 using a transceiver 160-a. When the shared homogeneous device resource 412 is a local device resource 162-1, the share configuration message 508-1 may be omitted and operations of the local device resource 162-1 continue per normal procedures. When the shared homogeneous device resource 412 is a remote device resource 164-1, however, the share configuration message 508-1 may be used to configure the local device resource 162-1 to stop generating resource information. In this case, the share confirmation message 508-1 may be sent to the local device resource 162-1, a controller for the local device resource 162-1, or a power manager for a power supply providing power to the local device resource 162-1. The share configuration messages 508-2, 508-3 are processed by the remote devices 122-1, 122-2, respectively, in a similar manner. In this way, the share manager component 222-3 may cause a device to switch between a producer role and a consumer role based on a share role identifier 512-t.

Once the local device 120 and remote devices 122-c are properly configured for resource share operations, the share manager component 222-3 may begin sharing shared resource information 180 on a periodic, aperiodic, continuous, or on-demand basis. In one embodiment, the share manager component 222-3 may retrieve (or receive) resource information 524 from a remote data source by the shared homogeneous device resource 412 when the shared homogeneous device resource is a local device resource 162-b, and send shared resource information 180 in the form of one or more resource share messages 522-q comprising the shared homogeneous resource identifier 510, the session identifier 514, and shared resource information 524 from the shared homogeneous device resource 412 to one or more remote devices 122-c. Alternatively, the share manager component 222-3 may receive shared resource information 180 in the form of one or more resource share messages 522-q with shared resource information 524 from the shared homogeneous device resource 412 when the shared homogeneous device resource 412 is a remote device resource 164-d.

When in a transmit mode, the share manager component 222-3 may monitor a local device resource 162-b and intercept any output from the local device resource 162-b.

The share manager component 222-3 may then generate resource share messages 522-q with the intercepted output for transmission to the remote devices 122-c via one of the transceivers 160-a. The share manager component 222-3 may send resource share messages 522-q using a uni-cast or multi-cast technique. When using the former technique, for example, the share manager component 222-3 may establish a peer-to-peer or ad-hoc connection between the local device 120 and each remote device 122-c. When using the latter technique, for example, the share manager component 222-3 may use a multicast address that is does not change no matter which device is sharing data. Depending on a given communication technique, the use of a shared homogeneous device resource identifier 510 or session identifier 514 may be optional to uniquely identify a shared homogeneous device resource 412.

The share manager component 222-3 may select a transceiver 160-a based on geographic proximity of the local device 120 and the remote devices 122-c. For instance, when the local device 120 and the remote devices 122-c are geographically close to each other, such as within 1 to 300 meters, the share manager component 222-3 may send the resource share messages 522-q using the transceiver 160-1 designed for shorter range communications, thereby conserving power relative to the transceiver 160-2. When the local device 120 and the remote devices 122-c are geographically distant from each other, such as greater than 300 meters, the share manager component 222-3 may send the resource share messages 522-q using the transceiver 160-2 designed for longer range communications. Intelligent transceiver selection may allow the local device 120 and the remote device 122-c options to configure resource share operations as desired for a given implementation, such as a low power option, a high signal quality option, and other performance constraints.

When in a receive mode, the share manager component 222-3 may receive the resource share messages 522-q via a same transceiver 160-a corresponding to the transceiver 160-a used by the remote devices 122-c. The share manager component 222-3 may monitor for messages (or packets) having the shared homogeneous device resource identifier 510, and retrieve the shared resource information 524 from the message. The share manager component 222-3 may then route the shared resource information 524 to a consumer of the shared resource information 524, such as a software application. For instance, when the shared resource information 524 is GPS information, the consumer might be navigation or mapping software implemented by the local device 120.

Once the resource share application 140 identifies a shared homogeneous device resource 412, and begins sharing shared resource information 524 during a session, the resource share application 140 may change the shared homogeneous device resource 412 during the session in response to various events or changing conditions. For instance, the resource share application 140 may switch a shared homogeneous device resource 412 according to expiration of the timer 506. In another example, the resource share application 140 may switch a shared homogeneous device resource 412 when the shared homogeneous device resource 412 ceases operation. This could be due to battery depletion, a resource malfunction, a device malfunction, a device entering a lower power state, a communications failure, and so forth. In yet another example, the resource share application 140 may switch a shared homogeneous device resource 412 in response to a changing local operational parameter 402-g or remote operational parameter 404-*h*. In still another example, the resource share application 140 may switch a shared homogeneous device resource 412 according to a resource share policy designed to ensure fair use of resources. In yet another example, the resource share application 140 may switch a shared homogeneous device resource 412 in response to user control directives. The embodiments are not limited to these examples.

As shown and described with reference to FIG. 11, the local device 120 may further comprise a touch-screen display communicatively coupled to the processor circuit 130. The touch-screen display may receive user control directives to configure the resource share application 140, and present various types of user interfaces for the source shared application 140, such as graphical user interface (GUI) views for the resource share application 140, for example. For instance, the GUI views may allow a user to configure a device for resource share operations, initiate resource share operations, accept or deny a request to enter resource share operations, negotiate a set of negotiated share parameters 414-*m*, cease resource share operations, switch share roles for resource share operations, configure user preferences, and so forth.

Figure 6A:
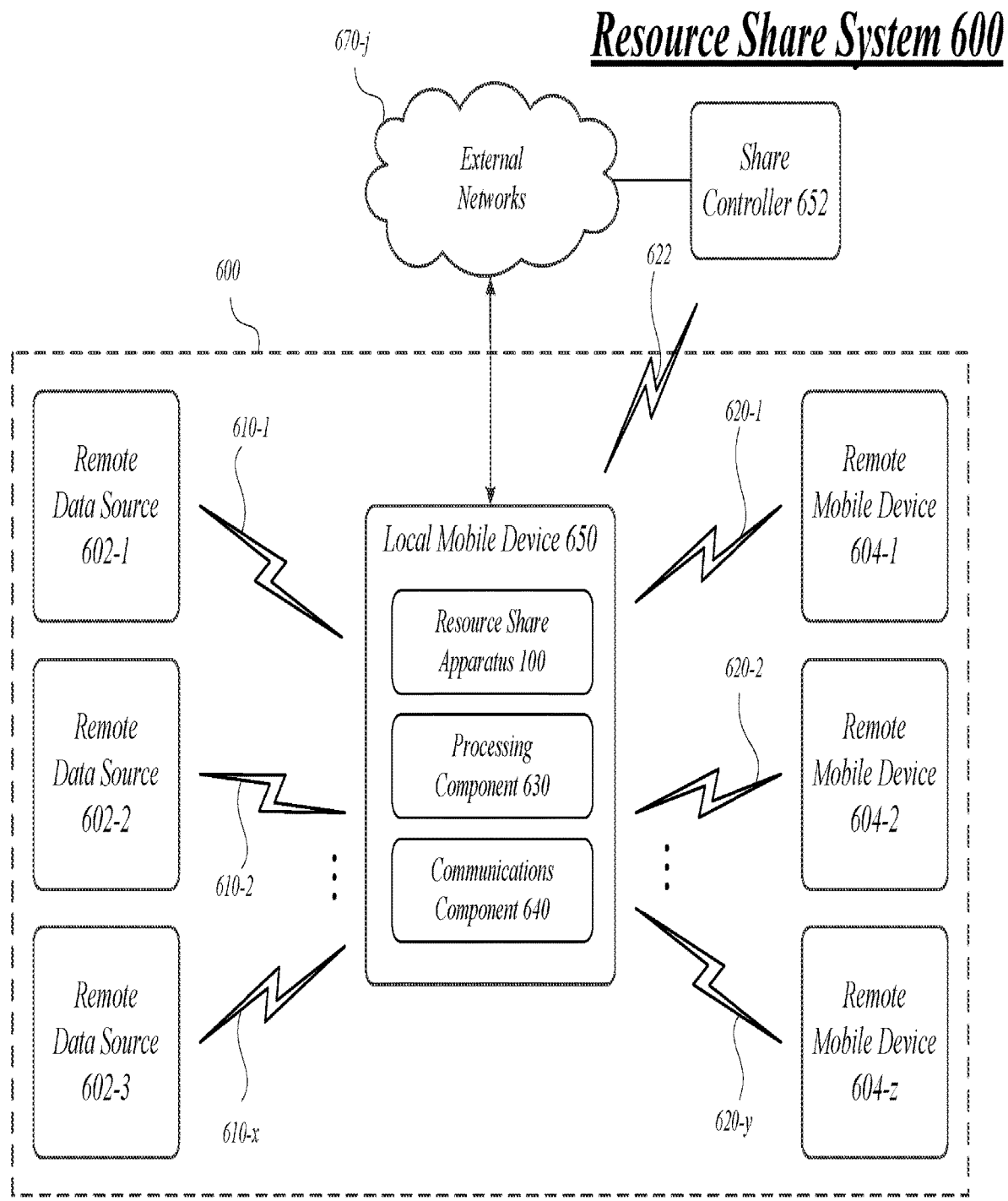
FIG. 6A illustrates an embodiment of a first aspect of a resource share system.

FIG. 6A illustrates an embodiment of a resource share system 600. The resource share system 600 illustrates a network diagram with network elements and devices suitable for implementing the resource share apparatus 100. More particularly, the resource share system 600 illustrates a local mobile device 650 and a set of mobile devices 604-*z* capable of sharing device resources implemented by a single device among multiple devices.

In the illustrated embodiment shown in FIG. 6A, the resource share system 600 may include a local mobile device 650. The local mobile device 650 may comprise an exemplary implementation for the local device 120. The local mobile device 650 may comprise any portable electronic device having computing capabilities, communications capabilities, and a portable power source such as a battery. Examples for the local mobile device 650 may include without limitation an ultra-mobile device, a mobile computing device, a smart phone, a handheld computer, a tablet computer, a remote control, a gaming device, a consumer electronic device, and so forth. The embodiments are not limited in this context.

The local mobile device 650 may execute processing operations or logic for the resource share apparatus 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. An example for the processing component 630 may include the processing circuit 130 as described with reference to FIG. 1. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The local mobile device 650 may execute communications operations or logic for the resource share apparatus 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 610-*x*, 620-*y* may be implemented as wired communications media and/or wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. An example for the communications component 640 may include the transceivers 160-*a*, although other implementations similar to those described above may work as well. The embodiments are not limited in this context.

The local mobile device 650 may communicate with one or more remote data sources 602-*h* via the communications component 640 over the communications media 610-*x*. A remote data source 602-*h* is any external data source arranged to provide resource information 520 for a local device resource 162-*b* and/or a remote device resource 164-*d* selected as a shared homogenous device resource 412.

When a shared homogeneous device resource 412 is a transceiver 160-*a* designed to provide short-range or long-range communications, such as transceiver 160-1, 160-2, respectively, a remote data source 602-*h* may comprise a network device that allows wireless devices to connect to a wired network using IEEE 802.11 (WiFi), IEEE 802.15 (WPAN), IEEE 802.16 (WiMAX), Wireless Gigabit Alliance (WiGig), IEEE 802.20 (Mobile Broadband Wireless Access), or related standards. In this case, the remote data source 602-*h* usually connect to a router via a wired network shown as one of the external networks 670-*j*, and can relay data between the wireless devices such as the local mobile device 650 and wired devices on the external network 670-*j*.

When a shared homogeneous device resource 412 is a transceiver 160-*a*, such as a transceiver 160-3 (or singular receiver 160-3) designed to provide location based services (LBS) for the local device 120, a remote data source 602-*h* may comprise a satellite of a satellite navigation system (e.g., a GPS system), or a terrestrial or earth-based beacon (e.g., a cellular base station, wireless access points, broadcast towers, and so forth).

When a shared homogeneous device resource 412 is a sensor, such as a biometric sensor, a thermal sensor, an environmental sensor (e.g., barometer, cold, wind, pressure, etc.), a proximity sensor, or an accelerometer, the remote data source 602-*h* may be a corresponding source of resource information 520 suitable for the given type of sensor. For instance, if the shared homogenous device resource 412 is a thermal sensor, the remote data source 602-*h* may comprise a heat source (e.g., a human body, solar waves, etc.).

These are but a few examples for a remote data source 602-*h*. Variations of a remote data source 602-*h* may correspond to variations in a local device resource 162-*b* and/or a remote device resource 164-*d* selected as a shared homogenous device resource 412. The embodiments are not limited to these examples.

The local mobile device 650 may also communicate with one or more mobile devices 604-*z*. The mobile devices 604-*z* may comprise exemplary implementations for the remote devices 122-*c*. As previously described, mobile devices 604-*z* are any electronic devices that are physically and structurally separate from the local mobile device 650. More particularly, mobile devices 604-*z* may comprise any electronic devices with computing capabilities, communications capabilities, and a portable power supply. Examples for a remote mobile device 604-*z* may include the same examples as given for the local mobile device 650. The embodiments are not limited in this context.

As further shown in FIG. 6A, the resource share system 600 may include a share controller 652. The share controller 652 may comprise an external, third-party controller unit, which itself is not participating in resource sharing and implements no resources, but rather organizes a sharing event between the local mobile device 652 and a remote mobile device 604-*z* through an external network 670-*j* or wireless communication media 622. The share controller 652 may be implemented as a network resource accessible via the external network 670-*j*, or a separate electronic device within communication range of the local mobile device 652 and one or more remote mobile devices 604-*z*. For example, the share controller 652 may be implemented by a computing device on a bus, and it may manage sharing roles and device discovering aspects for the mobile devices of the bus riders, and inform each device of its respective share role.

Figure 6B:
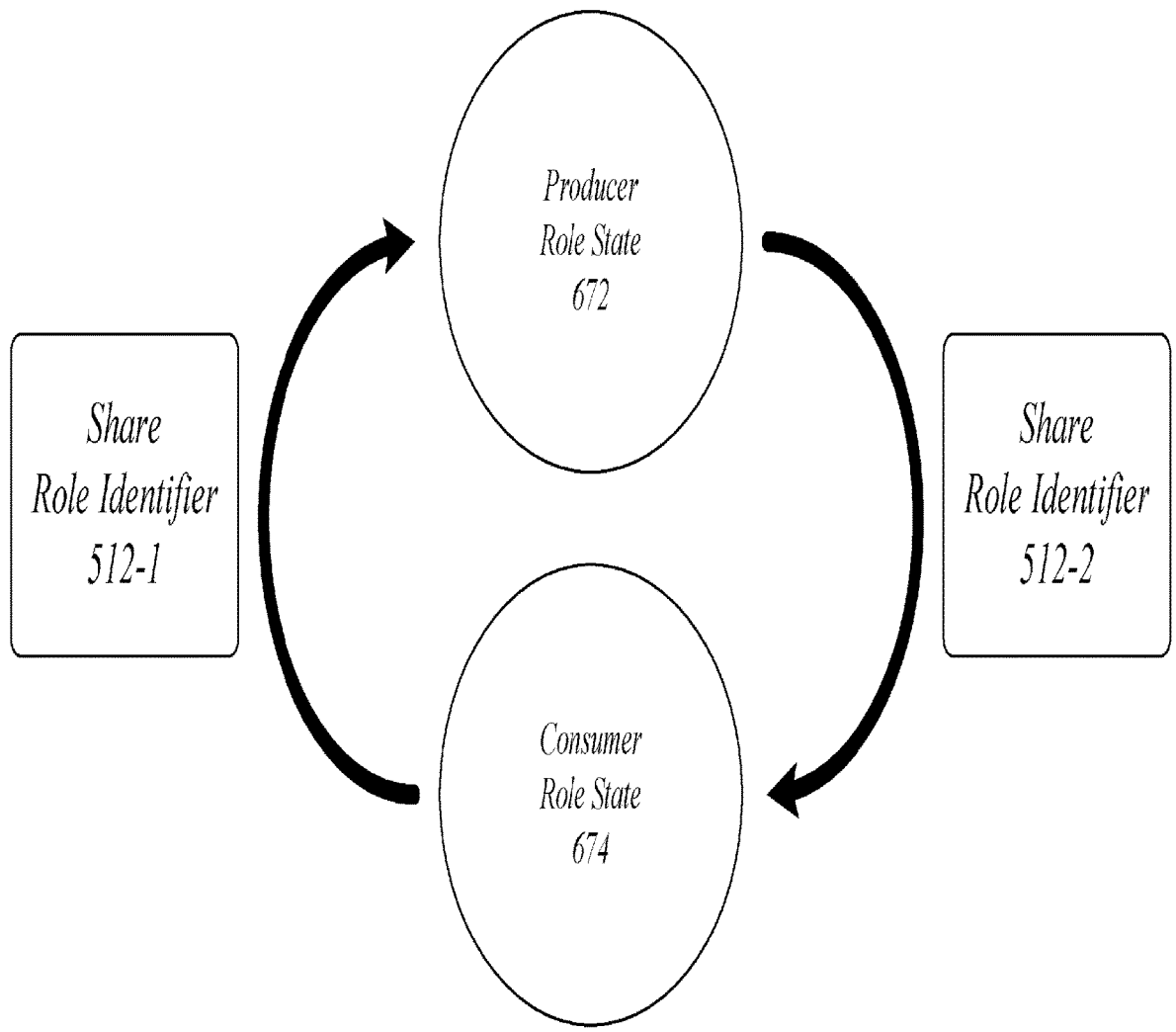
FIG. 6B illustrates an embodiment of a second aspect of a resource share system.

FIG. 6B illustrates an embodiment of a resource share system 600. FIG. 6B illustrates a state diagram 670 for the mobile devices 650, 604-1 as described with reference to FIG. 6A. It may be appreciated that the example given for the remote mobile device 604-1 may be implemented for other mobile devices 604-2 . . . 604-*z*.

The state diagram 670 illustrates different potential share role states for a mobile device 650, 604-1. As previously described with reference to FIG. 5, the share manager component 222-3 may generate a share role identifier 512-*t* for each device, such as a first share role identifier 512-1 for a device implementing the shared homogeneous device resource 412, and a second share role identifier 512-2 for one or more devices not implementing the shared homogeneous device resource 412. As shown in FIG. 6B, the share manager component 222-3 may generate a producer role as a first share role identifier 512-1 for a local mobile device 650 when implementing a shared homogeneous device resource 412, and a consumer role as a second share role identifier 512-2 for a remote mobile device 604-1 not implementing the shared homogeneous device resource 412, and vice-versa.

When the local mobile device 650 receives the share role identifier 512-1, the local mobile device 650 may switch to a producer role state 672. When in the producer role state 672, the local mobile device 650 produces shared resource information 524 for the remote mobile device 604-1. When the local mobile device 650 receives the share role identifier 512-2, the local mobile device 650 may switch to a consumer role state 674. When in the consumer role state 674, the local mobile device 650 consumes shared resource information 524 from the remote mobile device 604-1. The remote mobile device 604-1 may switch between the producer role state 672 and the consumer role state 674 in a manner similar to the local mobile device 650.

Although the state diagram 670 only shows two role states 672, 674 corresponding to a binary production or consumption of shared resource information 524, respectively, it may be appreciated that other share role states may be defined corresponding to varying implementations. For instance, the state diagram 670 may have a neutral role state where a mobile device 650, 604-1 is neither producing nor consuming share resource information 524.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein. For example, the logic flow 700 may illustrate operations performed by the resource share apparatus 100.

In the illustrated embodiment shown in FIG. 7, the logic flow 700 may identify a set of homogeneous device resources implemented by multiple devices based in part on resource configuration information received by a wireless transceiver at block 702. For example, the resource identifier component 222-1 of the resource share application 140 may identify a set of homogeneous device resources 310-*f* implemented by multiple devices (e.g., local device 120, remote devices 122-*c*, local mobile device 650, mobile devices 604-*z*) based in part on resource configuration information 110 received by a transceiver 160-*a*. The resource configuration information 110 may include, for example, a remote resource share list 304, remote operational parameters 404-*h*, and a device identifier 504-*o*.

The logic flow 700 may select a shared homogeneous device resource of one of the multiple devices to share between the multiple devices at block 704. For example, the resource selector component 222-2 of the resource share application 140 may select a shared homogeneous device resource 412 of one of the multiple devices such as a local device 120 to share between the multiple devices such as the local device 120 and one or more remote devices 122-*c*.

The logic flow 700 may send shared configuration information to identify the shared homogeneous device resource and a share role for each of the multiple devices at block 706. For example, the share manager component 222-3 of the resource share application 140 may send shared configuration information 170 to identify the shared homogeneous device resource 412 and a share role for each of the multiple devices comprising the local device 120 and one or more remote devices 122-c. The share role may comprise, for example, a producer role state 672 or a consumer role state 674.

The logic flow 700 may send resource share messages with shared resource information from the shared homogeneous device resource when the shared homogeneous device resource is a local device resource at block 708. For example, when in a producer role state 672, the share manager component 222-3 may send resource share messages 522-q with shared resource information 524 from the shared homogeneous device resource 412 to the one or more remote devices 122-c when the shared homogeneous device resource is a local device resource 162-b.

The logic flow 700 may receive shared resource messages with shared resource information from the shared homogeneous device resource when the shared homogeneous device resource is a remote device resource at block 710. For example, when in a consumer role state 674, the share manager component 222-3 may receive shared resource messages 522-q with shared resource information 524 from the shared homogeneous device resource 412 when the shared homogeneous device resource 412 is a remote device resource 164-d of a remote device 122-c.

FIG. 8 illustrates one embodiment of a logic flow 800. The logic flow 800 may be representative of some or all of the operations executed by one or more embodiments described herein. For example, the logic flow 800 may illustrate operations performed by the resource share apparatus 100. More particularly, the logic flow 800 may provide more detailed operations to identify a set of homogeneous device resources 310-f at block 702 of the logic flow 700 as described with reference to FIG. 7.

In the illustrated embodiment shown in FIG. 8, the logic flow 800 may compare a set of local device resources and a set of remote device resources at block 802. For example, the resource identifier component 222-1 may retrieve a local resource share list 306 from a memory unit 150, the local resource share list 306 comprising a set of local device resources 162-b available for sharing among the local device 120 and one or more remote devices 122-c. The resource identifier component 222-1 may retrieve a remote resource share list 304 from the resource configuration information 110, the remote resource share list 304 comprising a set of remote device resources 164-d available for sharing among the local device 120 and one or more remote devices 122-c. The resource identifier component 222-1 may compare the set of local device resources 162-b and the set of remote device resources 164-d.

The logic flow 800 may detect a match between one or more of the local device resources and the remote device resources to form a subset of matched device resources at block 804. For example, the resource identifier component 222-1 may detect a match between one or more of the local device resources 162-b and the remote device resources 164-d to form a subset of matched device resources 308-e. The granularity of matching may vary according to a desired implementation, ranging anywhere from an identical match to a gross match. The gross match may require additional components, such as a translation component (not shown), to ensure compatible data feeds.

The logic flow 800 may return a set of homogeneous device resources comprising the subset of matched device resources at block 806. For example, the resource identifier component 222-1 may return a set of homogeneous device resources 310-f comprising the subset of matched device resources 308-e.

FIG. 9 illustrates one embodiment of a logic flow 900. The logic flow 900 may be representative of some or all of the operations executed by one or more embodiments described herein. For example, the logic flow 900 may illustrate operations performed by the resource share apparatus 100. More particularly, the logic flow 900 may provide more detailed operations to select a shared homogeneous device resource 412 at block 704 of the logic flow 700 as described with reference to FIG. 7.

In the illustrated embodiment shown in FIG. 9, the logic flow 900 may compare a set of local operational parameters and a set of remote operational parameters with threshold operational parameters at block 902. For example, the resource selector component 222-2 may compare a set of local operational parameters 402-g and a set of remote operational parameters 404-h associated with the homogenous device resources 310-f with one or more threshold operational parameters 406-j.

The logic flow 900 may generate a set of candidate device resources based on the comparison results at block 904. For example, the resource selector component 222-2 may generate a set of candidate device resources 408-k based on the comparison results. For instance, the set of candidate device resources 408-k may include those homogenous device resources 310-f having local operational parameters 402-g and/or remote operational parameters 404-h that are greater than one or more threshold operational parameters 406-j, equal to one or more threshold operational parameters 406-j, or lower than one or more threshold operational parameters 406-j.

The logic flow 900 may exchange resource negotiation messages with one or more remote devices to assist in selection of the shared homogeneous device resource at block 906. For example, the resource selector component 222-2 may exchange resource negotiation messages 410-l with one or more remote devices 122-c to assist in selection of the shared homogeneous device resource 412.

The logic flow 900 may select the shared homogeneous device resource from the set of candidate device resources at block 908. For example, the resource selector component 222-2 may select the shared homogeneous device resource 412 from the set of candidate device resources 408-k based on the negotiation results.

Figure 10A:
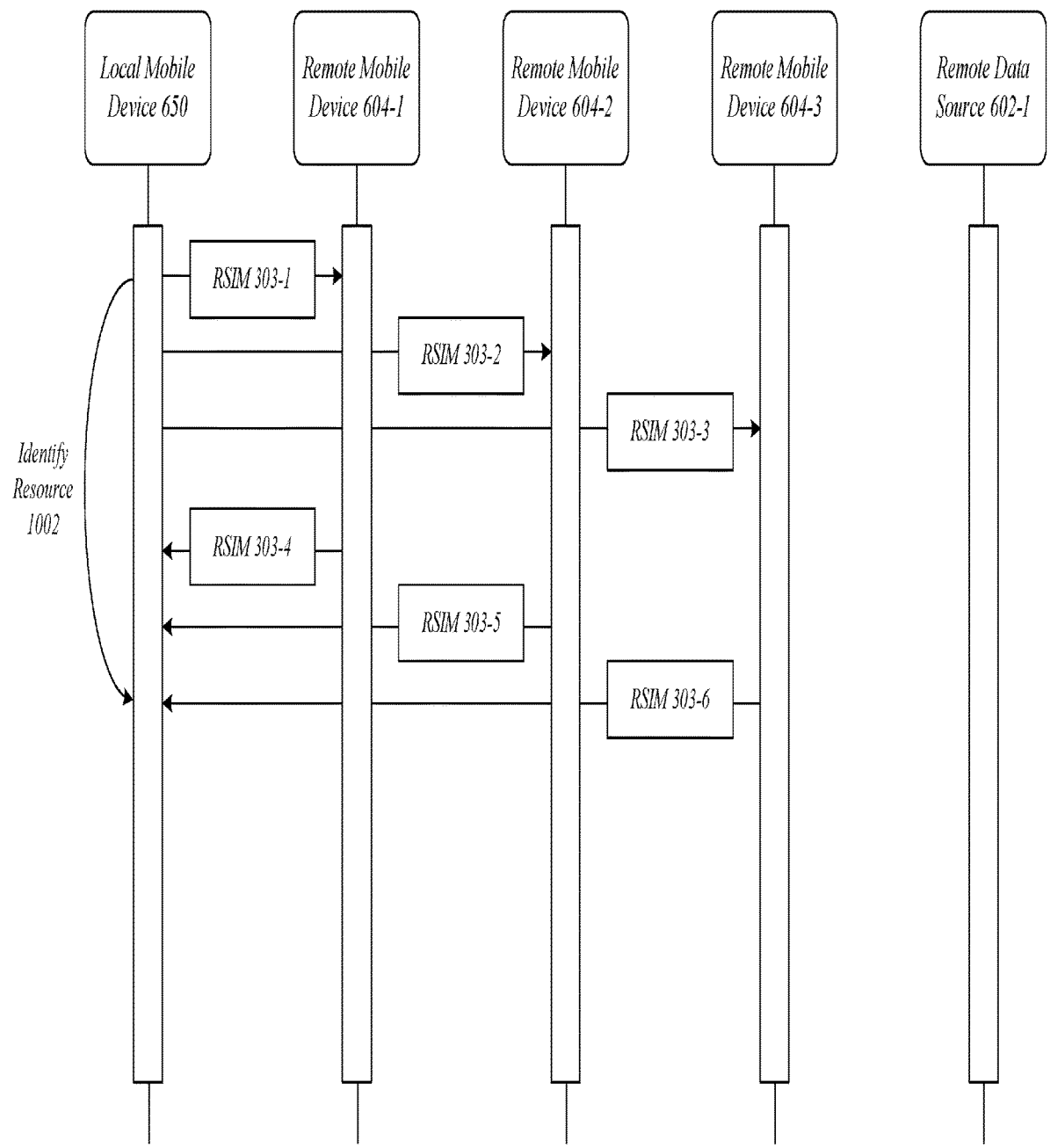
FIG. 10A illustrates an embodiment of a first message flow.

FIG. 10A illustrates an embodiment of a message flow 1000. The message flow 1000 as shown in FIG. 10A represents an exemplary flow of messages between various electronic devices comprising part of the resource share system 600 to identify remote device resources 164-d for remote mobile devices 604-z.

In the illustrated embodiment shown in FIG. 10A, the local mobile device 650 may execute identify resource operations 1002 to initiate resource scans by broadcasting resource share identify messages 303-1, 303-2 and 303-3 requesting resource configuration information 110 from the remote mobile devices 604-1, 604-2 and 604-3, respectively, each configured with a resource share application 140. The remote mobile devices 604-1, 604-2 and 604-3 may respond with resource share identify messages 303-4, 303-5 and 303-6, respectively, each containing a different set of resource configuration information 110.

Figure 10B:
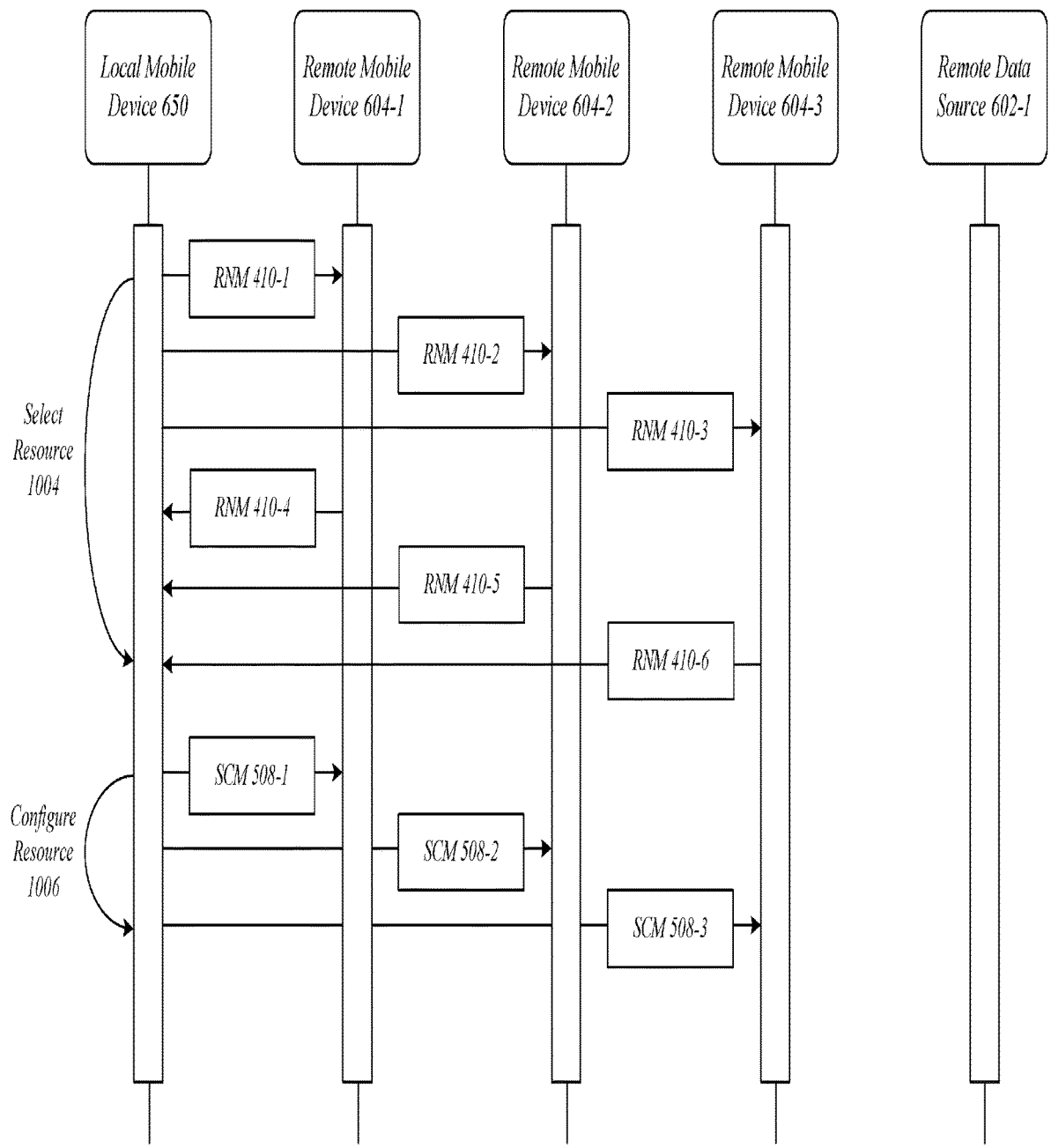
FIG. 10B illustrates an embodiment of a second message flow.

FIG. 10B illustrates an embodiment of the message flow 1000. The message flow 1000 as shown in FIG. 10B represents an exemplary flow of messages between various electronic devices comprising part of the resource share system 600 to select and configure a shared homogeneous device resource 412 from the local device resources 162-*b* of the local mobile device 650 or remote device resources 164-*d* for remote mobile devices 604-*z*.

In the illustrated embodiment shown in FIG. 10B, the local mobile device 650 may execute select resource operations 1004 to select a shared homogeneous device resource 412 by sending resource negotiation messages 410-1, 410-2 and 410-3 with the remote mobile devices 604-1, 604-2, and 604-3, respectively. Since local device resources 162-*b* and remote device resources 164-*d* are implemented by separate devices, the resource selector component 222-2 may need to obtain permission before selecting one of the device resources 162-*b*, 164-*d* as a shared homogeneous device resource 412 due to resource drain, privacy issues, preferences, or other concerns. The remote mobile devices 604-1, 604-2 and 604-3 may respond with resource negotiation messages 410-4, 410-5 and 410-6, respectively, to negotiate a set of negotiated resource parameters 414-*m*.

Once the negotiation phase is completed, the local mobile device 650 may execute configure resource operations 1006 to configure the remote mobile devices 604-1, 604-2 and 604-3 by sending share configuration messages 508-1, 508-2, and 508-3, respectively, with the share configuration information 170. The resource share applications 140 for the remote mobile devices 604-1, 604-2 and 604-3 may switch each of the remote mobile devices 604-1, 604-2 and 604-3 to a producer role state 672 or a consumer role state 674 in accordance with the share configuration information 170, such as the share role identifiers 512-1, 512-2.

Figure 10C:
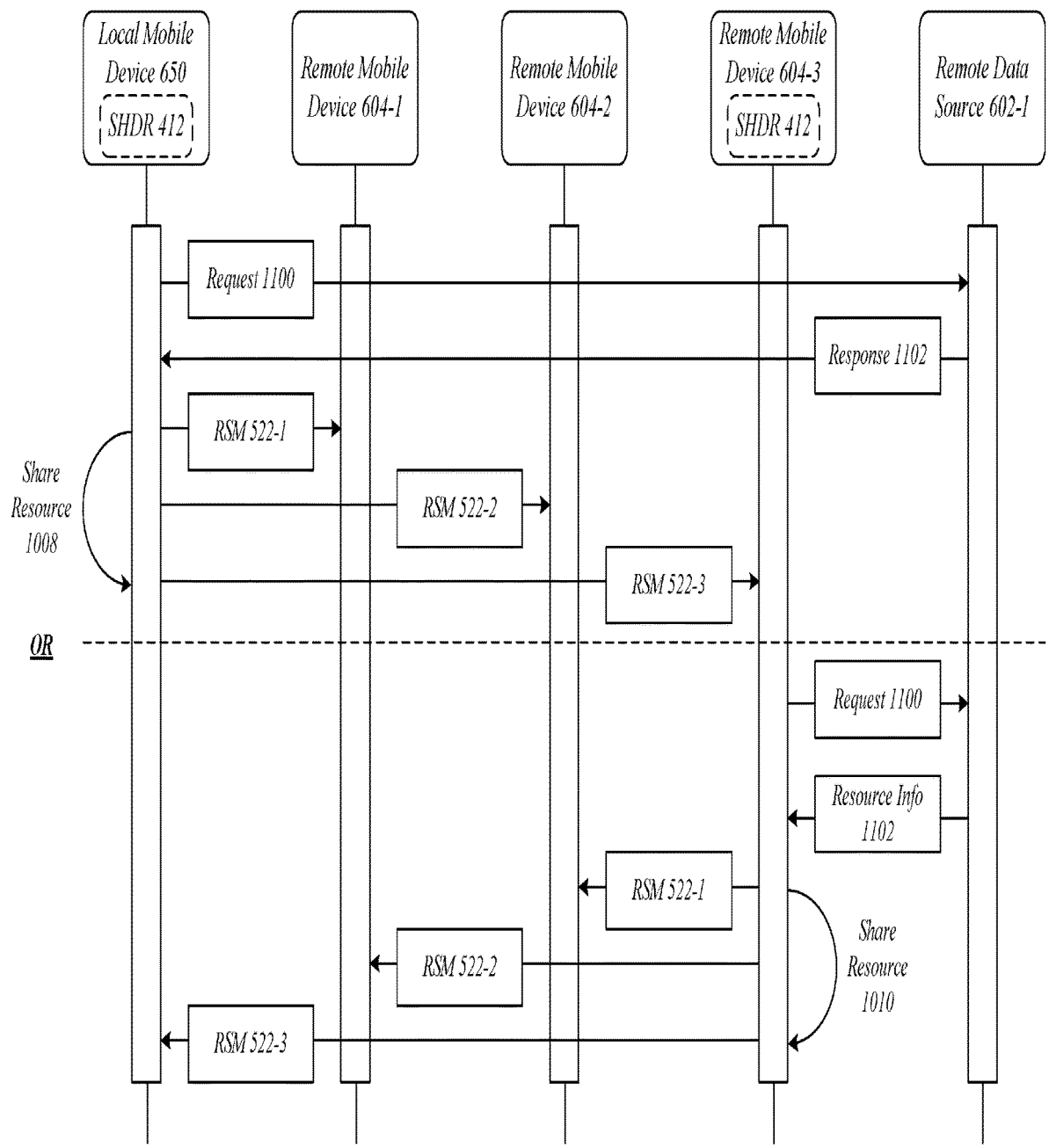
FIG. 10C illustrates an embodiment of a third message flow.

FIG. 10C illustrates an embodiment of the message flow 1000. The message flow 1000 as shown in FIG. 10C represents an exemplary flow of messages between various electronic devices comprising part of the resource share system 600 to share a shared homogeneous device resource 412 between the local mobile device 640 and one or more remote mobile devices 604-*z*.

When the shared homogeneous device resource 412 is implemented by the local mobile device 650, the local mobile device 650 may execute share resource operations 1008 to share shared resource information 180 by sending a request message 1100 to request resource information 520 from a remote data source 602-1. The remote data source 602-1 may send a response message 1102 with the resource information 520. The local mobile device 650 may then send shared resource information 180 in the form of resource share messages 522-1, 522-2 and 522-3 comprising a shared homogeneous resource identifier 510 and shared resource information 524 from the shared homogeneous device resource 412 to the remote mobile devices 604-1, 604-2 and 604-3, respectively.

Alternatively, when the shared homogeneous device resource 412 is implemented by a remote mobile device 604-*z*, such as the remote mobile device 604-3, the remote mobile device 604-3 may execute share resource operations 1010 to share shared resource information 180 by sending a request message 1100 to request resource information 520 from a remote data source 602-1. The remote data source 602-1 may send a response message 1102 with the resource information 520. The remote mobile device 604-3 may then send shared resource information 180 in the form of resource share messages 522-1, 522-2 and 522-3 comprising a shared homogeneous resource identifier 510 and shared resource information 524 from the shared homogeneous device resource 412 to the remote mobile devices 604-1, 604-2 and the local mobile device 650, respectively.

Figure 11:
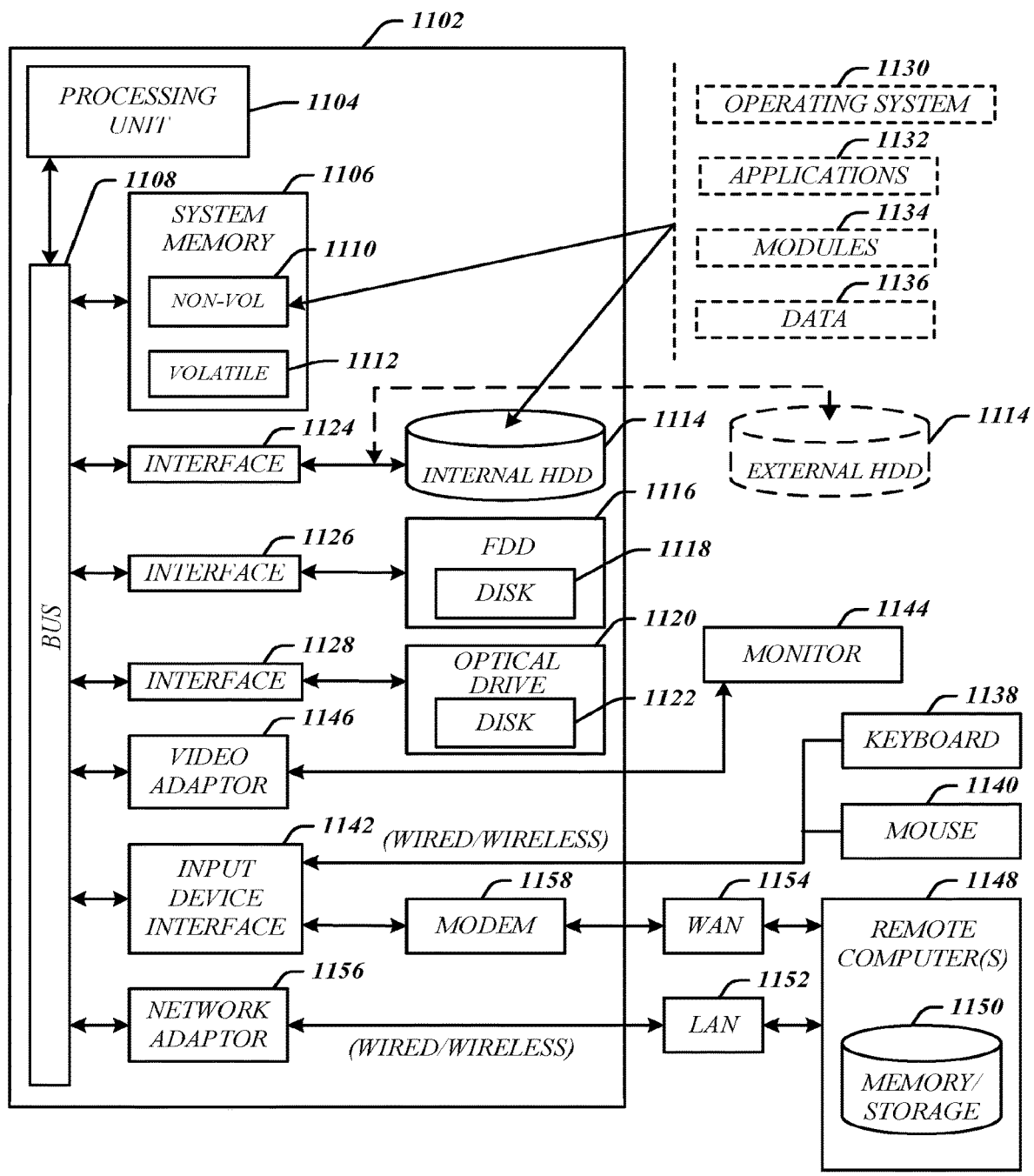
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIGS. 1, 6A, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, such as those described with reference to the processor circuit 130 shown in FIG. 1.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

Figure 12:
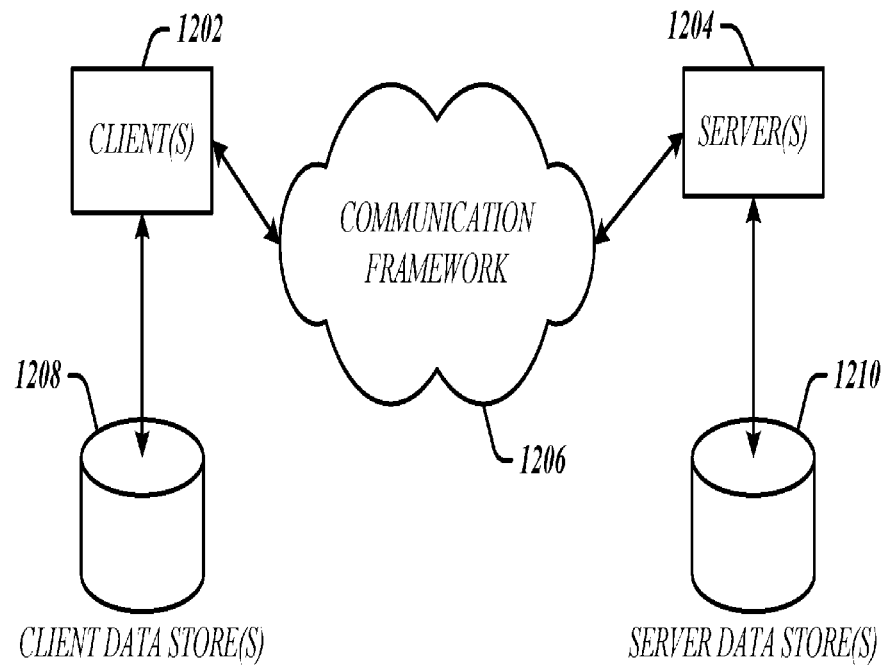
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Some exemplary embodiments suitable for some claims may include without limitation the following examples of a method, a computer-readable storage medium, and an apparatus. Other embodiments are described and claimed.

In various embodiments, a method may comprise identifying, by a processor circuit, a set of homogeneous resources implemented by multiple devices based in part on resource configuration information received by a transceiver; selecting a shared homogeneous device resource of one of the multiple devices to share between the multiple devices, the shared homogeneous device resource to provide more efficient utilization and conservation of energy resources by reducing energy usage of the multiple devices; and sending shared configuration information to identify the shared homogeneous device resource and a share role for each of the multiple devices. The method may further comprise retrieving resource information from a remote data source by the shared homogeneous device resource when the shared homogeneous device resource is a local device resource; and sending resource share messages with shared resource information from the shared homogeneous device resource to one or more remote devices. The method may further comprise receiving shared resource messages with shared resource information from the shared homogeneous device resource when the shared homogeneous device resource is a remote device resource. The method may further comprise receiving a user control directive to initiate resource share operations; and sending a resource share identify message to request resource configuration information from one or more remote devices. The method may further comprise retrieving a local resource share list from a memory unit, the local resource share list comprising a set of local device resources available for sharing among the multiple devices; and retrieving a remote resource share list from the resource configuration information, the remote resource share list comprising a set of remote device resources available for sharing among the multiple devices. The method may further comprise comparing a set of local device resources and a set of remote device resources; detecting a match between one or more of the local device resources and the remote device resources to form a subset of matched device resources; and returning a set of homogeneous device resources comprising the subset of matched device resources. The method may further comprise comparing a set of local operational parameters and a set of remote operational parameters with threshold operational parameters; generating a set of candidate device resources based on the comparison results; and selecting the shared homogeneous device resource from the set of candidate device resources. The method may further comprise exchanging resource negotiation messages with one or more remote devices to select the shared homogeneous device resource. The method may further comprise generating a set of negotiated share parameters for the shared homogeneous device resource, the set of negotiated share parameters including a share role parameter for each of the multiple devices. The method may further comprise receiving the shared homogeneous device resource and a device identifier associated with a device implementing the shared homogeneous device resource; and generating a shared homogeneous device resource identifier for the shared homogeneous device resource using the device identifier. The method may further comprise receiving a share role parameter associated with a device implementing the shared homogeneous device resource; generating a producer share role identifier for the device implementing the shared homogeneous device resource; and generating a consumer share role identifier for devices not implementing the shared homogeneous device resource. The method may further comprise receiving the shared homogeneous device resource and a session parameter associated with a device implementing the shared homogeneous device resource; and generating a session identifier for a session to share the shared homogeneous device resource. The method may further comprise generating a session identifier for a session to share the shared homogeneous device resource; initiating a timer to monitor a defined time interval for the session; and terminating the session when the timer expires. The method may further comprise sending share configuration messages with the shared configuration information to the multiple devices, the shared configuration information comprising a shared homogeneous device resource identifier, a share role identifier, and a session identifier. The method may further comprise switching a device between a producer role state and a consumer role state based on a share role identifier. Other embodiments are described and claimed.

In various embodiments, at least one computer-readable storage medium may comprise instructions that, when executed, cause a system to: identify a set of homogeneous device resources implemented by a local mobile device and a remote mobile device; select a shared homogeneous device resource from the set of homogeneous device resources to share between the local mobile device and the remote mobile device, the shared homogeneous device resource to provide more efficient utilization and conservation of energy resources by reducing energy usage of the local mobile device and the remote mobile device; and send shared configuration information to identify the shared homogeneous device resource and a share role to the remote mobile device. The at least one computer-readable storage medium may further comprise instructions to retrieve a local resource share list comprising a set of local device resources available for sharing between the local mobile device and the remote mobile device; and retrieve a remote resource share list comprising a set of remote device resources available for sharing between the local mobile device and the remote mobile device. The at least one computer-readable storage medium may further comprise instructions to compare a set of local device resources and a set of remote device resources; detect a match between one or more of the local device resources and the remote device resources to form a subset of matched device resources; and return a set of homogeneous device resources comprising the subset of matched device resources. The at least one computer-readable storage medium may further comprise instructions to compare a set of local operational parameters and a set of remote operational parameters with a set of threshold operational parameters; generate a set of candidate device resources based on the comparison results; and select the shared homogeneous device resource from the set of candidate device resources. The at least one computer-readable storage medium may further comprise instructions to exchange resource negotiation messages with the remote device to select the shared homogeneous device resource. The at least one computer-readable storage medium may further comprise instructions to generate a shared homogeneous device resource identifier for the shared homogeneous device resource using a device identifier; generate a share role identifier for the local mobile device and the remote mobile device; generate a session identifier for a session to share the shared homogeneous device resource; and send a resource configuration message to the remote mobile device with the shared homogeneous device resource identifier, the share role identifier, and the session identifier. The at least one computer-readable storage medium may further comprise instructions to retrieve resource information from a remote data source by the shared homogeneous device resource when the shared homogeneous device resource is a local device resource, and send resource share messages with shared resource information from the shared homogeneous device resource to the remote device. The at least one computer-readable storage medium may further comprise instructions to receive resource share messages with shared resource information from the shared homogeneous device resource when the shared homogeneous device resource is a remote device resource of the remote mobile device. Other embodiments are described and claimed.

In various embodiments, an apparatus may comprise a transceiver; a processor circuit communicatively coupled to the wireless transceiver; and a memory unit communicatively coupled to the processor circuit, the memory unit to store a resource share application operative on the processor circuit to share a homogeneous device resource among multiple devices, the resource share application comprising: a resource identifier component operative to identify a set of homogeneous device resources implemented by multiple devices based in part on resource configuration information received by the wireless transceiver; a resource selector component operative to select a shared homogeneous device resource of one of the multiple devices to share between the multiple devices, the shared homogeneous device resource to provide more efficient utilization and conservation of energy resources by reducing energy usage of the multiple devices; and a share manager component operative to send shared configuration information to identify the shared homogeneous device resource and a share role for each of the multiple devices. The apparatus may further comprise the resource identifier component operative to receive as input a user control directive to initiate resource share operations, and send as output a resource share identify message to request resource configuration information from one or more remote devices. The apparatus may further comprise the resource identifier component operative to retrieve a local resource share list from the memory unit, the local resource share list comprising a set of local device resources available for sharing among the multiple devices, the set of local device resources including a location device, a sensor, or a transceiver. The apparatus may further comprise the resource identifier component operative to retrieve a remote resource share list from the resource configuration information, the remote resource share list comprising a set of remote device resources available for sharing among the multiple devices, the set of remote device resources including a location device, a sensor, or a transceiver. The apparatus may further comprise the resource identifier component operative to compare a set of local device resources and a set of remote device resources, detect a match between one or more of the local device resources and the remote device resources to form a subset of matched device resources, and return a set of homogeneous device resources comprising the subset of matched device resources. The apparatus may further comprise the resource selector component operative to receive as input the set of homogeneous device resources, a set of local operational parameters representing a current operational state for a corresponding set of local device resources, and a set of remote operational parameters representing a current operational state for a corresponding set of remote device resources. The apparatus may further comprise the resource selector component operative to compare a set of local operational parameters and a set of remote operational parameters with threshold operational parameters stored in the memory unit, generate a set of candidate device resources based on the comparison results, and select the shared homogeneous device resource from the set of candidate device resources. The apparatus may further comprise the resource selector component operative to exchange resource negotiation messages with one or more remote devices to select the shared homogeneous device resource. The apparatus may further comprise the resource selector component operative to generate a set of negotiated share parameters for the shared homogeneous device resource, the set of negotiated share parameters including a share role parameter for each of the multiple devices. The apparatus may further comprise the share manager component operative to receive the shared homogeneous device resource and a device identifier associated with a device implementing the shared homogeneous device resource, and generate a shared homogeneous device resource identifier for the shared homogeneous device resource using the device identifier. The apparatus may further comprise the share manager component operative to receive the shared homogeneous device resource and a share role parameter associated with a device implementing the shared homogeneous device resource, generate a first share role identifier for the device implementing the shared homogeneous device resource, and generate a second share role identifier for devices not implementing the shared homogeneous device resource. The apparatus may further comprise the share manager component operative to receive the shared homogeneous device resource and a session parameter associated with a device implementing the shared homogeneous device resource, and generate a session identifier for a session to share the shared homogeneous device resource. The apparatus may further comprise the share manager component operative to receive the shared homogeneous device resource and a session parameter associated with a device implementing the shared homogeneous device resource, the session parameter having a defined time interval, generate a session identifier for a session to share the shared homogeneous device resource, initiate a timer to monitor the defined time interval, and terminate the session when the timer expires. The apparatus may further comprise the share manager component operative to send share configuration messages with the share configuration information to the multiple devices, the share configuration information comprising a shared homogeneous device resource identifier, a share role identifier, and a session identifier. The apparatus may further comprise the share manager component operative to switch a device between a producer role state and a consumer role state based on a share role identifier. The apparatus may further comprise the share manager component operative to: retrieve resource information from a remote data source by the shared homogeneous device resource when the shared homogeneous device resource is a local device resource; and send resource share messages with shared resource information from the shared homogeneous device resource to one or more remote devices. The apparatus may further comprise the share manager component operative to receive resource share messages with shared resource information from the shared homogeneous device resource when the shared homogeneous device resource is a remote device resource. The apparatus may further comprise a touch-screen display communicatively coupled to the processor circuit, the touch-screen display operative to receive user control directives to configure the resource share application, and present user interface views for the resource share application. Other embodiments are described and claimed.

The invention claimed is:

1. An apparatus, comprising:
a processor; and
a memory comprising instructions that when executed by the processor cause the processor to:
compare a set of local device resources associated with a local device and a set of remote device resources associated with a remote device;
detect a match between one or more local device resources in the set of local device resources and one or more remote device resources in the set of remote device resources to form a subset of matched device resources; and
identify a set of homogenous device resources based on the subset of matched device resources, the set of homogenous device resources suitable for sharing between the local device and the remote device.

2. The apparatus of claim 1, the memory comprising instructions that when executed by the processor cause the processor to select a shared homogenous device resource from the set of homogenous device resources to share between the local device and the remote device based on a set of local operational parameters and a set of remote operational parameters.

3. The apparatus of claim 1, the memory comprising instructions that when executed by the processor cause the processor to detect the match between the one or more local device resources and the one or more remote device resources based on one or more of a device name, a device part number, a device version number, and a device manufacturer.

4. The apparatus of claim 1, the memory comprising instructions that when executed by the processor cause the processor to:
compare a set of local operational parameters and a set of remote operational parameters with threshold operational parameters;
generate a set of candidate device resources based on comparison of the set of local operational parameters and the set of remote operational parameters with threshold operational parameters; and
select a shared homogenous device resource from the set of homogenous device resources based on the set of candidate device resources.

5. The apparatus of claim 4, wherein the set of local operational parameters comprise a current operational state for the local device resources in the set of homogenous device resources and the set of remote operational parameters comprise a current operational state for the remote device resources in the set of homogenous device resources.

6. The apparatus of claim 4, the memory comprising instructions that when executed by the processor cause the processor to:
exchange resource negotiation messages with the remote device; and
select the shared homogenous device resource from the set of homogenous device resources based on the set of candidate device resources and the resource negotiation messages exchanged with the remote device.

7. The apparatus of claim 6, the memory comprising instructions that when executed by the processor cause the processor to establish one or more conditions for use of the shared homogenous device resource based on the resource negotiation messages exchanged with the remote device.

8. The apparatus of claim 1, the memory comprising instructions that when executed by the processor cause the processor to:
determine the set of local device resources based on a local device resource share list, the set of local device resources comprising resources available for sharing among a local device and one or more remote devices; and
determine the set of remote device resources based on a remote device resources share list comprising resources available for sharing among a local device and one or more remote devices.

9. The apparatus of claim 1, the memory comprising instructions that when executed by the processor cause the processor to detect a range of matches between the one or more local device resources in the set of local device resources and the one or more remote device resources in the set of remote device resources to form a subset of matched device resources, the range of matches comprising an identical match and a gross match, wherein the gross match requires a translation component to ensure compatible data feeds.

10. At least one non-transitory computer-readable medium comprising a set of instructions that, in response to being executed by a processor circuit, cause the processor circuit to:
compare a set of local device resources associated with a local device and a set of remote device resources associated with a remote device;
detect a match between one or more local device resources in the set of local device resources and one or more remote device resources in the set of remote device resources to form a subset of matched device resources; and
identify a set of homogenous device resources based on the subset of matched device resources, the set of homogenous device resources suitable for sharing between the local device and the remote device.

11. The at least one non-transitory computer-readable medium of claim 10, comprising instructions that, in response to being executed by the processor circuit, cause the processor circuit to select a shared homogenous device resource from the set of homogenous device resources to share between the local device and the remote device based on a set of local operational parameters and a set of remote operational parameters.

12. The at least one non-transitory computer-readable medium of claim 10, comprising instructions that, in response to being executed by the processor circuit, cause the processor circuit to detect the match between the one or more local device resources and the one or more remote device resources based on one or more of a device name, a device part number, a device version number, and a device manufacturer.

13. The at least one non-transitory computer-readable medium of claim 10, comprising instructions that, in response to being executed by the processor circuit, cause the processor circuit to:
compare a set of local operational parameters and a set of remote operational parameters with threshold operational parameters;
generate a set of candidate device resources based on comparison of the set of local operational parameters and the set of remote operational parameters with threshold operational parameters; and
select a shared homogenous device resource from the set of homogenous device resources based on the set of candidate device resources.

14. The at least one non-transitory computer-readable medium of claim 13, wherein the set of local operational parameters comprise a current operational state for the local device resources in the set of homogenous device resources and the set of remote operational parameters comprise a current operational state for the remote device resources in the set of homogenous device resources.

15. The at least one non-transitory computer-readable medium of claim 13, comprising instructions that, in response to being executed by the processor circuit, cause the processor circuit to:
exchange resource negotiation messages with the remote device; and
select the shared homogenous device resource from the set of homogenous device resources based on the set of candidate device resources and the resource negotiation messages exchanged with the remote device.

16. The at least one non-transitory computer-readable medium of claim 15, comprising instructions that, in response to being executed by the processor circuit, cause the processor circuit to establish one or more conditions for use of the shared homogenous device resource based on the resource negotiation messages exchanged with the remote device.

17. The at least one non-transitory computer-readable medium of claim 10, comprising instructions that, in response to being executed by the processor circuit, cause the processor circuit to:
determine the set of local device resources based on a local device resource share list, the set of local device resources comprising resources available for sharing among a local device and one or more remote devices; and determine the set of remote device resources based on a remote device resources share list comprising resources available for sharing among a local device and one or more remote devices.

18. The at least one non-transitory computer-readable medium of claim 10, comprising instructions that, in response to being executed by the processor circuit, cause the processor circuit to detect a range of matches between the one or more local device resources in the set of local device resources and the one or more remote device resources in the set of remote device resources to form a subset of matched device resources, the range of matches comprising an identical match and a gross match, wherein the gross match requires a translation component to ensure compatible data feeds.

19. A computer-implemented method, comprising:
comparing a set of local device resources associated with a local device and a set of remote device resources associated with a remote device;
detecting a match between one or more local device resources in the set of local device resources and one or more remote device resources in the set of remote device resources to form a subset of matched device resources; and
identifying a set of homogenous device resources based on the subset of matched device resources, the set of homogenous device resources suitable for sharing between the local device and the remote device.

20. The computer-implemented method of claim 19, comprising selecting a shared homogenous device resource from the set of homogenous device resources to share between the local device and the remote device based on a set of local operational parameters and a set of remote operational parameters.

21. The computer-implemented method of claim 19, comprising detecting the match between the one or more local device resources and the one or more remote device resources based on one or more of a device name, a device part number, a device version number, and a device manufacturer.

22. The computer-implemented method of claim 19, comprising:
comparing a set of local operational parameters and a set of remote operational parameters with threshold operational parameters;
generating a set of candidate device resources based on comparison of the set of local operational parameters and the set of remote operational parameters with threshold operational parameters; and
selecting a shared homogenous device resource from the set of homogenous device resources based on the set of candidate device resources.

23. The computer-implemented method of claim 22, wherein the set of local operational parameters comprise a current operational state for the local device resources in the set of homogenous device resources and the set of remote operational parameters comprise a current operational state for the remote device resources in the set of homogenous device resources.

24. The computer-implemented method of claim 22, comprising:
exchanging resource negotiation messages with the remote device; and
selecting the shared homogenous device resource from the set of homogenous device resources based on the set of candidate device resources and the resource negotiation messages exchanged with the remote device.

25. The computer-implemented method of claim 24, comprising establishing one or more conditions for use of the shared homogenous device resource based on the resource negotiation messages exchanged with the remote device.

* * * * *